United States Patent
Sugimoto et al.

(10) Patent No.: US 12,108,143 B2
(45) Date of Patent: Oct. 1, 2024

(54) PORTABLE IMAGING DEVICE

(71) Applicant: Safie Inc., Tokyo (JP)

(72) Inventors: Hideki Sugimoto, Tokyo (JP); Hironori Sakamoto, Tokyo (JP); Yusuke Shimada, Tokyo (JP); Longshen Yang, Tokyo (JP)

(73) Assignee: Safie Inc., Tokyo (JP)

( * ) Notice: Subject to any disclaimer, the term of this patent is extended or adjusted under 35 U.S.C. 154(b) by 0 days.

(21) Appl. No.: 18/418,600

(22) Filed: Jan. 22, 2024

(65) Prior Publication Data

US 2024/0259672 A1    Aug. 1, 2024

(30) Foreign Application Priority Data

Jan. 31, 2023  (JP) ................. 2023-012465

(51) Int. Cl.
*H04N 23/63* (2023.01)
*H04N 7/18* (2006.01)
*H04N 23/62* (2023.01)
*H04N 23/68* (2023.01)
*H04N 23/69* (2023.01)

(52) U.S. Cl.
CPC .......... *H04N 23/633* (2023.01); *H04N 7/183* (2013.01); *H04N 23/62* (2023.01); *H04N 23/6812* (2023.01); *H04N 23/683* (2023.01); *H04N 23/69* (2023.01)

(58) Field of Classification Search
CPC ...... H04N 23/633; H04N 7/183; H04N 23/62; H04N 23/6812; H04N 23/683; H04N 23/69
USPC .......................................... 348/158
See application file for complete search history.

(56) References Cited

U.S. PATENT DOCUMENTS

| | | | | |
|---|---|---|---|---|
| 10,356,304 | B2* | 7/2019 | O'Donnell | G08B 13/19684 |
| 11,201,995 | B1* | 12/2021 | Sanchez | H04N 23/69 |
| 11,751,032 | B2* | 9/2023 | Wang | H04N 23/51 |
| | | | | 348/207.99 |
| 2009/0002478 | A1* | 1/2009 | Ueki | H04N 7/142 |
| | | | | 348/222.1 |
| 2017/0004600 | A1* | 1/2017 | Nishigori | H04N 23/69 |
| 2017/0064217 | A1* | 3/2017 | Ota | H04N 23/62 |

(Continued)

FOREIGN PATENT DOCUMENTS

| | | |
|---|---|---|
| JP | 2010-098662 A | 4/2010 |
| JP | 2010-109554 A | 5/2010 |

(Continued)

OTHER PUBLICATIONS

"Notice of Reasons for Refusal" Office Action issued in JP 2023-012465; mailed by the Japanese Patent Office on Apr. 27, 2023.

(Continued)

*Primary Examiner* — Thai Q Tran
*Assistant Examiner* — Stephen R Smith
(74) *Attorney, Agent, or Firm* — Studebaker & Brackett PC

(57) ABSTRACT

A portable imaging device is configured to: obtain video data through shooting; perform a first digital image processing on the video data; and stop the first digital image processing when performing a second digital image processing on the video data while the first digital image processing is being performed. The second digital image processing is different from the first digital image processing.

4 Claims, 21 Drawing Sheets

(56) References Cited

U.S. PATENT DOCUMENTS

| | | | | |
|---|---|---|---|---|
| 2021/0183023 A1* | 6/2021 | Nakajima | ............... | H04N 23/81 |
| 2022/0417405 A1* | 12/2022 | Song | ................... | H04N 23/685 |
| 2023/0209193 A1* | 6/2023 | Lee | ..................... | H04N 23/631 |
| | | | | 348/208.6 |
| 2023/0247292 A1* | 8/2023 | Stimm | ................... | H04N 23/45 |
| | | | | 348/36 |
| 2023/0412922 A1* | 12/2023 | Tsairi | ................... | H04N 23/665 |
| 2024/0031675 A1* | 1/2024 | Tian | ..................... | G06V 10/243 |
| 2024/0080543 A1* | 3/2024 | Manzari | ................. | H04N 23/71 |
| 2024/0089589 A1* | 3/2024 | Satoh | ................... | H04N 23/634 |

FOREIGN PATENT DOCUMENTS

| | | |
|---|---|---|
| JP | 2021-097402 A | 6/2021 |
| JP | 2022-144495 A | 10/2022 |
| WO | 2007/077614 A1 | 7/2007 |
| WO | 2017/104102 A1 | 6/2017 |

OTHER PUBLICATIONS

"Decision to Grant a Patent" Office Action issued in JP 2023-012465; mailed by the Japanese Patent Office on Aug. 15, 2023.

\* cited by examiner

PORTABLE IMAGING DEVICE

This application claims priority from Japanese Patent Application No. 2023-12465, filed on Jan. 31, 2023, the entire contents of which are hereby incorporated by reference.

BACKGROUND

Technical Field

The present disclosure relates generally to portable imaging devices.

Background Art

Japanese Patent Application Publication No. 2022-144495 (JP-A-2022-144495) discloses a remote operation support system. This support system includes a work machine such as a hydraulic excavator used at a construction site, and a remote operation support server and a remote operation device which are communicatively connected to the work machine via a network. In the remote operation support system, video data from a camera mounted on the work machine is transmitted to the remote operation device via the network. An operator can control a series of operations of the work machine from a remote location by checking the video data displayed on the remote operation device.

In the remote operation support system disclosed in JP-A-2022-144495, the zoom function and image stabilization function of the camera mounted on the work machine are stopped when the work machine is in operation. On the other hand, the zoom and image stabilization functions of the camera are activated when the work machine is not in operation. Thus, in the remote operation support system, the zoom and image stabilization functions of the camera are activated or deactivated depending on the operating state of the work machine.

In the meanwhile, in recent remote monitoring systems that use multiple surveillance cameras to monitor the progress of a construction site, at least some of the multiple surveillance cameras are worn on the body of the worker at the construction site (e.g., put in their breast pockets) or held by the worker. While the worker is moving, this type of surveillance camera (hereinafter referred to as "portable surveillance camera") shakes in conjunction with the shaking of the worker's body. This results in blurring of the video data captured by the portable surveillance camera. Therefore, it is preferable that image processing to suppress blurring of the video data (hereinafter referred to as "image stabilization") be performed on the video data while the worker is moving. Image stabilization allows the site supervisor to accurately understand the status of the construction site from a remote location. Portable surveillance cameras used in such situations often employ various digital correction functions such as digital image stabilization, digital zoom, and digital distortion correction in order to decrease the size and price of the portable surveillance camera. Thus, the following problems existed, for example.

(Case 1)

When a worker on a construction site receives instructions from a remote supervisor to focus surveillance on a specific area of the construction site, the worker stops at a desired location and the portable surveillance camera is removed from the worker's body as needed. The portable surveillance camera may then be fixedly positioned in a certain location and may capture video such that a specific area is included in the field of view of the portable surveillance camera. In this case, through the digital zoom function of the portable surveillance camera, a specific area that exists within the field of view of the camera is enlarged. Thus, it is possible to focus on remote monitoring of the specific area.

In such a case, blurring is unlikely to occur in the video data captured by the portable surveillance camera, so there is less need to activate the image stabilization function to suppress blurring of the video data. Rather, since the image stabilization function is activated, the computational load on the camera processor that executes digital image stabilization is increased. In particular, when both the digital zoom function and the digital image stabilization function are activated, the computational load on the camera processor increases. As a result, the battery consumption of the portable surveillance camera may increase and there may be a delay in the transmission of the video data. For this reason, it is preferable not to activate the digital image stabilization function when video data is unlikely to be blurred or when the digital zoom function is activated. However, under such circumstances, the worker may forget to deactivate the digital image stabilization function of the portable surveillance camera and may activate both the digital image stabilization and digital zoom functions. Even if the worker remembers to deactivate the digital image stabilization function of the portable surveillance camera, the operation to do so is cumbersome and time-consuming.

(Case 2)

As in Case 1, when a specific area is enlarged through the digital zoom function, there is no need to activate the digital distortion correction function to increase the angle of view of the portable surveillance camera in the first place. The digital distortion correction means a function that allows the portable surveillance camera to increase the angle of view by correcting distortions around four corners of the video data (each frame image), which are caused by lens of the portable surveillance camera. When both the digital zoom function and the digital distortion correction function are activated, the computational load on the camera processor increases. The increased computational load on the processor may increase the battery consumption of the portable surveillance camera and cause delays in the transmission of video data. Furthermore, the digital zoom function is a function to enlarge an area in the field of view of the camera, while the digital distortion correction function is a function to widen the angle of view of the camera. Therefore, they are functions with conflicting purposes, and thus there is no need to activate both functions at the same time. However, under such circumstances, the worker may forget to deactivate the digital distortion correction function of the portable surveillance camera and may activate both the digital distortion correction function and the digital zoom function. Even if the worker remembers to deactivate the digital distortion correction function of the portable surveillance camera, the operation to do so is cumbersome and time-consuming.

(Case 3)

In the situation of Case 1, when the worker wears the portable surveillance camera on his/her own body and moves again, the digital image stabilization function of the portable surveillance camera needs to be activated, while the digital zoom function of the portable surveillance camera does not need to be activated. Rather, it is not preferable to activate the digital zoom function when the worker is moving. This is because the operator cannot accurately understand the situation of the surrounding environment such as a construction site with video data where a certain area of the surrounding environment is enlarged. Furthermore, when both the digital zoom function and the digital image stabilization function are activated, the computational load on the camera processor increases. However, under such circumstances, the worker may forget to deactivate the digital zoom function of the portable surveillance camera and may activate both the digital image stabilization and digital zoom functions. Even if the worker remembers to deactivate the digital zoom function of the portable surveillance camera, the operation to do so is cumbersome and time-consuming.

(Case 4)

In the situation of Case 2, as in Case 3, when the worker wears the portable surveillance camera on his/her own body and moves again, the digital distortion correction function of the portable surveillance camera needs to be activated, while the digital zoom function of the portable surveillance camera does not need to be activated. However, under such circumstances, the worker may forget to deactivate the digital zoom function of the portable surveillance camera and may activate both the digital distortion correction and digital zoom functions. Even if the worker remembers to deactivate the digital zoom function of the portable surveillance camera, the operation to do so is cumbersome and time-consuming.

(Case 5)

Digital image stabilization and digital distortion correction functions are incompatible in principle. Namely, in the digital image stabilization function, the outer portion of the angle view of the image sensor is used as a margin for stabilization correction, and the inner portion of the angle view of the image sensor can be viewed by the user. Meanwhile, in the digital distortion correction function, the outer distortion of the angle view of the image sensor can be corrected so that the user can view the entire angle view of the image sensor. If both functions are activated at the same time, information on the outer portion of the angle view of the image sensor will be viewed by the user with missing information when the camera shake is large. Furthermore, not only does this increase the computational load on the camera processor, but in the worst case, it may even cause the video processing system of the camera to freeze. However, since many workers are not familiar with such an operation principle, some workers may try to activate the digital image stabilization function while the digital distortion correction function is being activated. Even if some workers are familiar with such an operation principle and can deactivate the digital distortion correction function and then activate the digital image stabilization function, the operation to do so is cumbersome and time-consuming.

(Case 6)

As in Case 5, many workers are not familiar with the principles of digital image processing as described above, some workers may try to activate the digital distortion correction function while the digital image stabilization function is being activated. Even if the worker understands the principles of digital image processing as described above and can deactivate the digital image stabilization function and then activate the digital distortion correction function, the operation to do so is cumbersome and time-consuming.

Thus, there is room to consider portable surveillance cameras that can suitably prevent situations where both of two different digital image processing functions (e.g., digital image stabilization function, digital zoom function, digital distortion correction function, etc.) are activated.

SUMMARY

The present disclosure provides a portable imaging device with improved usability. In particular, the present disclosure provides a portable imaging device that can suitably prevent situations where two different digital image processing functions are activated.

According to an aspect of the present disclosure, there is provided a portable imaging device. The portable imaging device is configured to: obtain video data through shooting; perform a first digital image processing on the video data; and stop the first digital image processing when performing a second digital image processing on the video data while the first digital image processing is being performed. The second digital image processing is different from the first digital image processing.

BRIEF DESCRIPTION OF THE DRAWINGS

For a better understanding of the nature and objects of an embodiment of the present disclosure, reference should be made to the following detailed description taken in conjunction with the accompanying drawings, in which.

DETAILED DESCRIPTION

Figure 1:
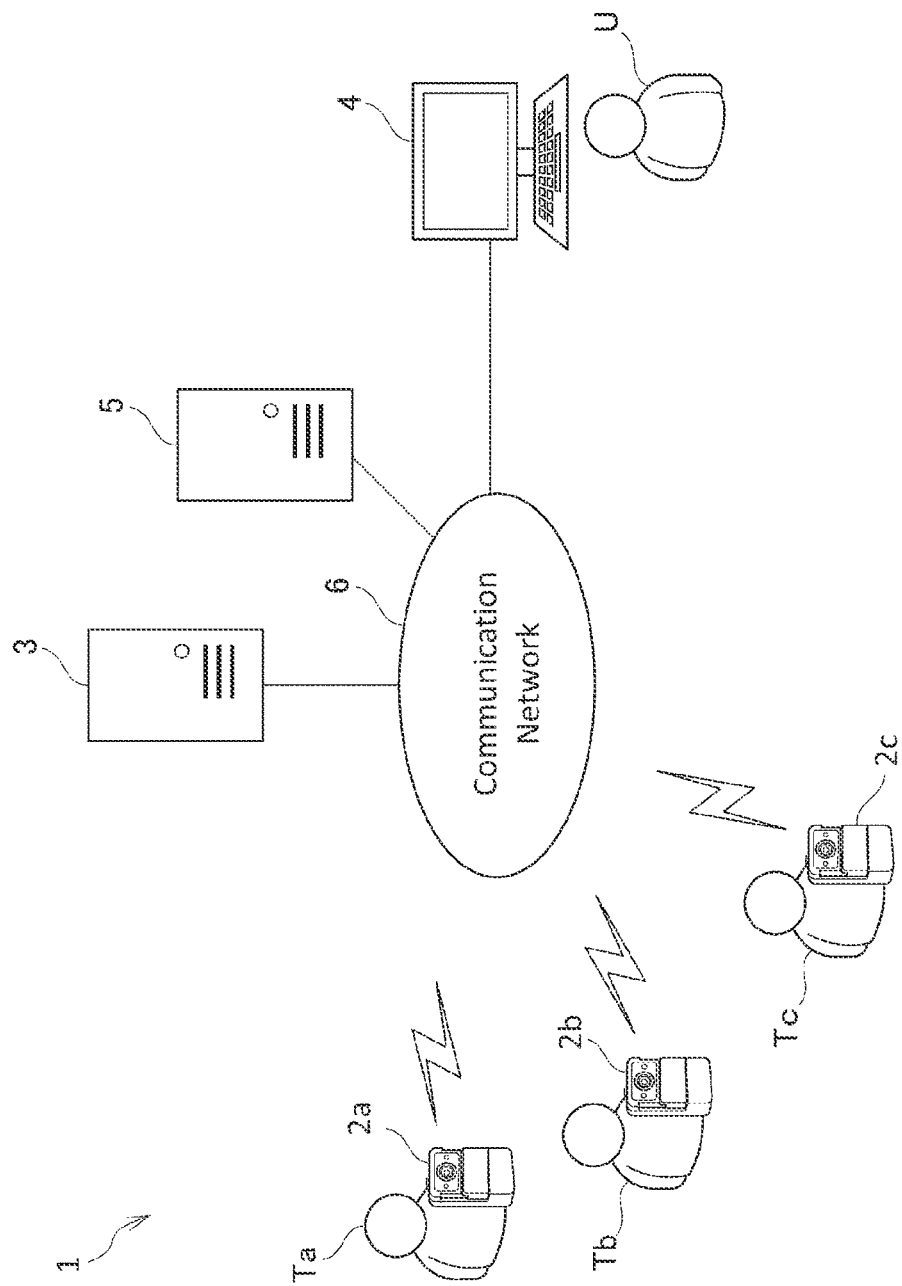
FIG. 1 illustrates an example configuration of a video processing system according to an embodiment (hereinafter, "the present embodiment") of the present disclosure.

In the following description of the disclosure and examples, a video processing system 1 according to the present embodiment will be described with reference to the drawings. FIG. 1 illustrates an example configuration of the video processing system 1 according to the present embodiment. As shown in FIG. 1, the video processing system 1 includes but not limited to cameras 2a to 2c, a server 3, a user device 4, and an external server 5. These elements are connected to a communication network 6. Each of the cameras 2a to 2c is communicatively connected to the server 3 via the communication network 6. The user device 4 is mainly used by an on-site supervisor. The user device 4 is communicatively connected to the server 3 via the communication network 6.

The cameras 2a to 2c (examples of imaging devices) are portable cameras. The camera 2a is worn on a part of the body of a worker Ta or is held by the worker Ta. The camera 2b is worn on a part of the body of a worker Tb or is held by the worker Tb. The camera 2c is worn on a part of the body of a worker Tc or is held by the worker Tc. Each camera 2a to 2c may be configured to acquire video data showing, for example, a construction site. The workers Ta to Tc may be construction site workers who work under the direction of the site supervisor.

In the present embodiment, each camera 2a to 2c is described as a stand-alone camera product, but they may also be incorporated into a portable communication terminal such as a smartphone or tablet. In the following description, the cameras 2a to 2c may be referred to collectively as simply camera 2. The workers Ta to Tc may also be referred to collectively as simply worker T.

The communication network 6 includes at least one of Local Area Network (LAN), Wide Area Network (WAN), Internet, and wireless core network, for example.

Next, the hardware configuration of the camera 2 (cameras 2a to 2c) will be described below with reference to FIG. 2. The cameras 2a to 2c shall have the same hardware configuration. The portable camera 2 is configured to acquire video data indicating the environment surrounding the camera 2 and to transmit the acquired video data to the server 3 via the communication network 6.

Figure 2:
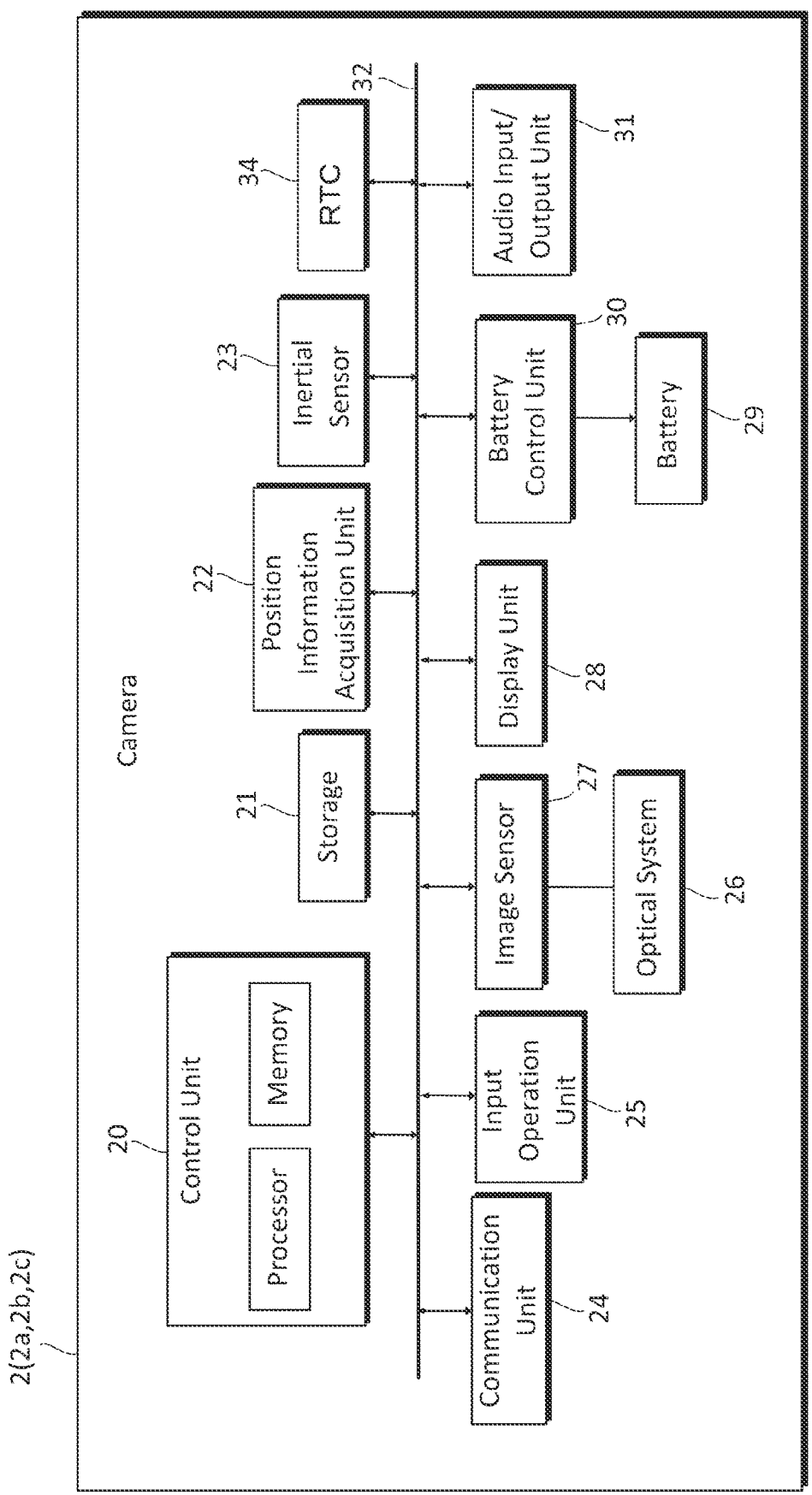
FIG. 2 illustrates an example hardware configuration of a camera.

As shown in FIG. 2, the camera 2 includes but not limited to a control unit 20, a storage 21, a position information acquisition unit 22, an inertial sensor 23, a Real Time Clock (RTC) 34, a communication unit 24, and an input operation unit 25. The camera 2 further includes an optical system 26, an image sensor 27, a display unit 28, a battery 29, a battery control unit 30, and an audio input/output unit 31. Except for the optical system 26 and battery 29, these elements are connected to a communication bus 32.

The control unit 20 includes a memory and a processor. The memory is configured to store computer readable instructions (programs). For example, the memory may include one or more read only memories (ROMs) each storing various programs and one or more random access memories (RAMs) each having multiple work areas where various programs executed by the processor are stored. The various programs may include a video processing program that executes a series of video processing processes according to the present embodiment. The processor may include at least one of one or more central processing units (CPUs), one or more micro processing units (MPUs), and one or more graphics processing units (GPUs), for example. The CPU may have multiple CPU cores. The GPU may have multiple GPU cores. The processor may be configured to expand on the RAM certain programs from the various programs installed in the storage 21 or the ROM and to execute various processes in cooperation with the RAM. In particular, the processor may execute a series of processes related to the digital image processing as described below by expanding a video processing program installed in the storage 21 or ROM onto RAM. In addition to a Neumann-type computer including a memory and a processor, the control unit 20 may further include a non-Neumann-type computer such as an application specific integrated circuit (ASIC) or field programmable gate array (FPGA).

The storage 21 maybe a hard disk drive (HDD), solid state drive (SSD), or flash memory, and is configured to store programs and various data (video data, position information, etc.). The position information acquisition unit 22 is configured to acquire information about the current position (longitude θ, latitude φ) of the camera 2. For example, the position information acquisition unit 22 maybe a global positioning system (GPS) receiver. For example, the position information acquisition unit 22 may acquire information about the current position of the camera 2 at a certain time interval (e.g., 10 seconds).

The inertial sensor 23 is configured to acquire movement data related to the movement of the camera 2. The inertial sensor 23 may for example, include an accelerometer configured to acquire acceleration data indicating the acceleration of the camera 2. The inertial sensor 23 may further include a gyro sensor configured to acquire angular rate data indicating the angular rate of the camera 2. In particular, the accelerometer may be configured to acquire acceleration data indicating the acceleration of the camera 2 in the three axes (X-axis, Y-axis, and Z-axis directions) set for the camera 2. The gyro sensor may be configured to acquire angular rate data indicating the angular rate of the camera 2 (in particular, the angular rate of roll, pitch, and yaw angles) around the three axes (X-axis, Y-axis, and Z-axis directions) of the camera 2.

The movement data acquired by inertial sensor 23 maybe acceleration data or may include acceleration data and angular rate data. The control unit 20 can estimate the movement direction and distance of the camera 2 based on the movement data acquired from the inertial sensor 23. The control unit 20 can also estimate the attitude angle of the camera 2 based on the movement data. Thus, as described below, the control unit 20 can perform digital image stabilization to electronically suppress blurring that occurs in the video data based on the movement data. The RTC 34 is configured to acquire time information indicating the current time.

The communication unit 24 is configured to connect the camera 2 to the communication network 6. The communication unit 24 includes, for example, a wireless communication module for wireless communication with external devices such as base stations and wireless LAN routers. The wireless communication module may include a transmitter/receiver antenna and a wireless transmitter/receiver circuit. The wireless communication module may be a wireless communication module compatible with short-range wireless communication standards such as Wi-Fi (registered trademark) and Bluetooth (registered trademark), or an X-generation mobile communication system using a subscriber identity module (SIM) (e.g., 4th generation mobile communication systems such as LTE).

The input operation unit 25 is configured to accept worker's input operations and to generate operation signals in response to the worker's input operations. The input operation unit 25 may include, for example, a plurality of control buttons on a housing 33 of the camera 2 (see FIG. 12). The input operation unit 25 may include a touch panel superimposed on the display unit 28.

The optical system 26 includes a plurality of optical lenses and color filters (RGB color filters) to guide the light forming the image toward the image sensor 27. The image sensor 27 is configured to capture videos showing the environment surrounding the camera 2. In particular, the image sensor 27 is configured to generate video signals indicating the environment surrounding the camera 2, and may include an image sensor and a sensor driving circuit.

The image sensor may include a charge-coupled device (CCD) or a complementary MOS (CMOS). The sensor driving circuit is configured to process the video signal (analog signal) photoelectrically converted by the image sensor and may include, for example, an amplifier and analog-to-digital (AD) converter. The control unit 20 generates video data based on the video signal (digital signal) transmitted from the image sensor 27. The video data includes still images (frames), and the frame rate of the video data is, for example, 30 fps.

Each frame of the video data obtained from the camera 2 maybe associated with the time (frame acquisition time) at which the frame was acquired. Each position information of the camera 2 obtained by the position information acquisition unit 22 maybe associated with the time (location acquisition time) at which the location was acquired.

Figure 12:
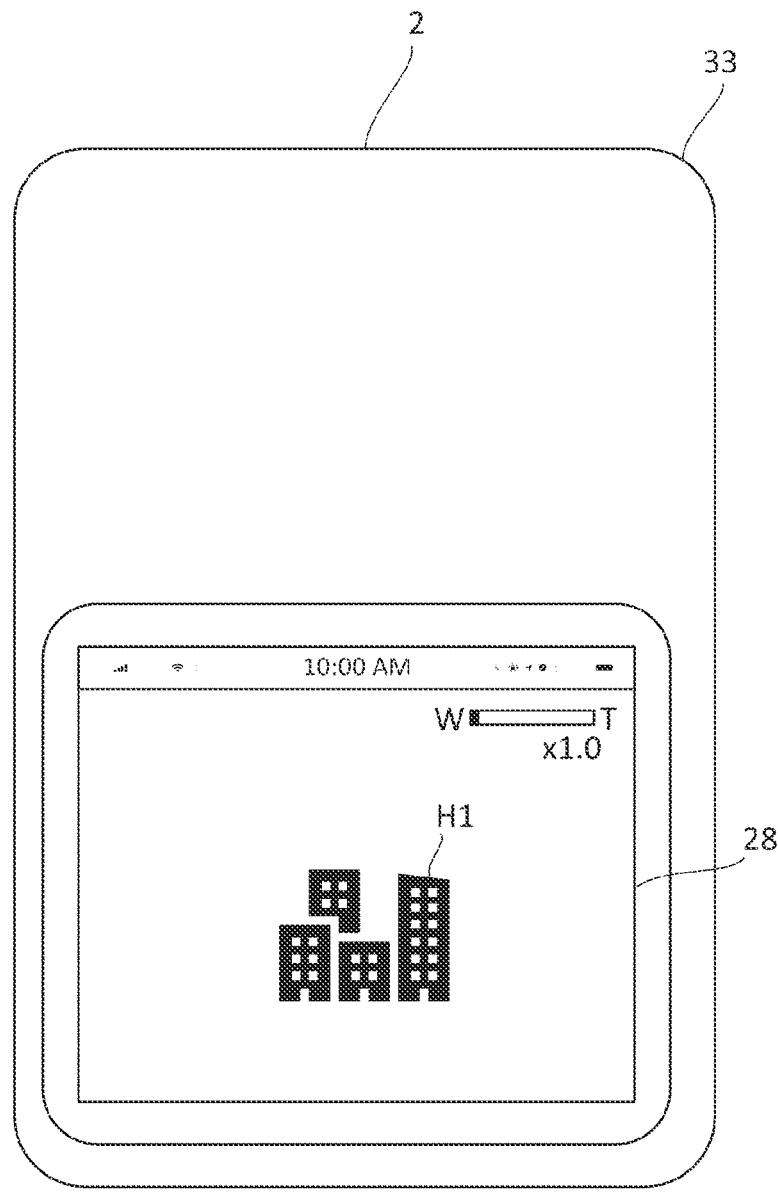
FIG. 12 illustrates an example of a display unit on the back of the camera.

The display unit 28 includes a video display, such as an LCD or organic EL display, and video display circuitry configured to drive and control the video display. The display unit 28 shows video data and various setting screens (described later). As shown in FIG. 12, the display unit 28 maybe located on the rear side of the camera 2.

The battery 29 is configured to provide electrical energy to the camera 2 and is, for example, a rechargeable battery. The battery control unit 30 is configured to monitor and control the charging and discharging state of the battery 29. The audio input/output unit 31 includes an audio input unit (e.g., microphone) configured to generate audio signals indicating audio surrounding the camera 2, and an audio output unit (e.g., speaker) configured to output audio to the outside based on the audio data.

The camera 2 can transmit the video data (video data stream) showing the environment surrounding the camera 2 to the server 3 in real time via the communication network 6. The camera 2 can also transmit the position information and movement data of the camera 2 to the server 3 via the communication network 6.

Figure 3:
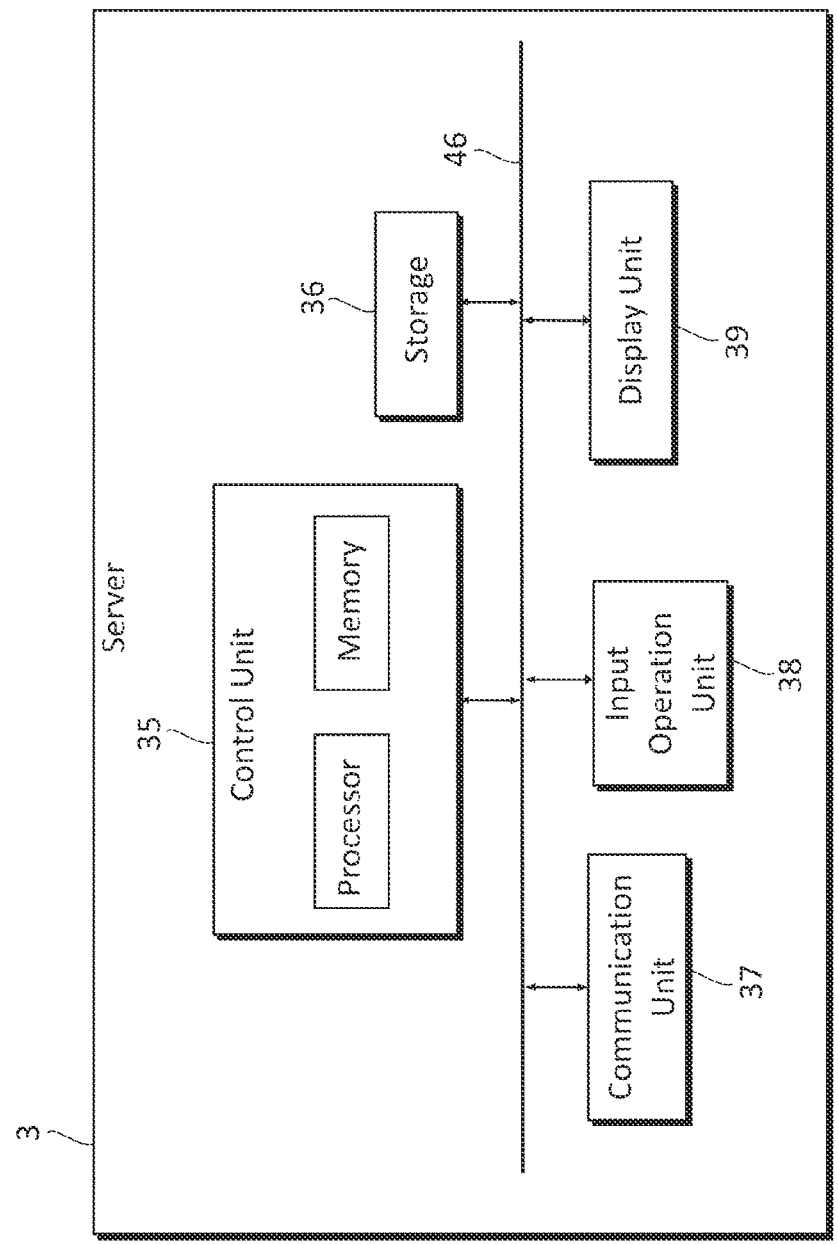
FIG. 3 illustrates an example hardware configuration of a server.

Next, the hardware configuration of the server 3 will be described below with reference to FIG. 3. The server 3 functions as a management server that manages the camera information table associated with the respective cameras 2a to 2c, the video data, and the user information table associated with respective users. The camera information table may include the network address (e.g., IP address), identification information, configuration information, and position information for each camera 2. The user information table may include attribute and contract information for each user and the camera identification associated with each user.

Furthermore, the server 3 also functions as a WEB server that transmits data (e.g., HTML files, CSS files, program files) for allowing a video display screen to be displayed on the WEB browser of the user device 4. Thus, the server 3 functions as a server for providing a system as a service (SaaS) and may be configured by multiple servers. The server 3 maybe built on-premise or may be a cloud server.

The server 3 is communicatively connected to the camera 2 and the user device 4 via the communication network 6. The server 3 is configured to transmit video data from the camera 2 to the user device 4 in response to a request from the user device 4. The server 3 includes but not limited to a control unit 35, a storage 36, a communication unit 37, an input operation unit 38, and a display unit 39. These elements are connected to a communication bus 46.

The control unit 35 includes a memory and a processor. The memory is configured to store computer readable instructions (programs). For example, the memory may include one or more ROMs and one or more RAMs. The processor may include at least one of CPU, MPU and GPU, for example.

The storage 36 may include at least one of a HDD, SSD, flash memory, and is configured to store programs and various data. Various databases may be stored in the storage 36. In particular, the storage 36 may store a camera information table associated with each camera 2, video data captured by each camera 2, and a user information table associated with each user.

The communication unit 37 may include various wired communication modules for communicating with external terminals on the communication network 6. The input operation unit 38 is, for example, a touch panel, mouse, and/or keyboard, and is configured to accept worker's input operations and to generate operation signals in response to the worker's input operations. The display unit 39 includes a video display and a video display circuitry.

Figure 4:
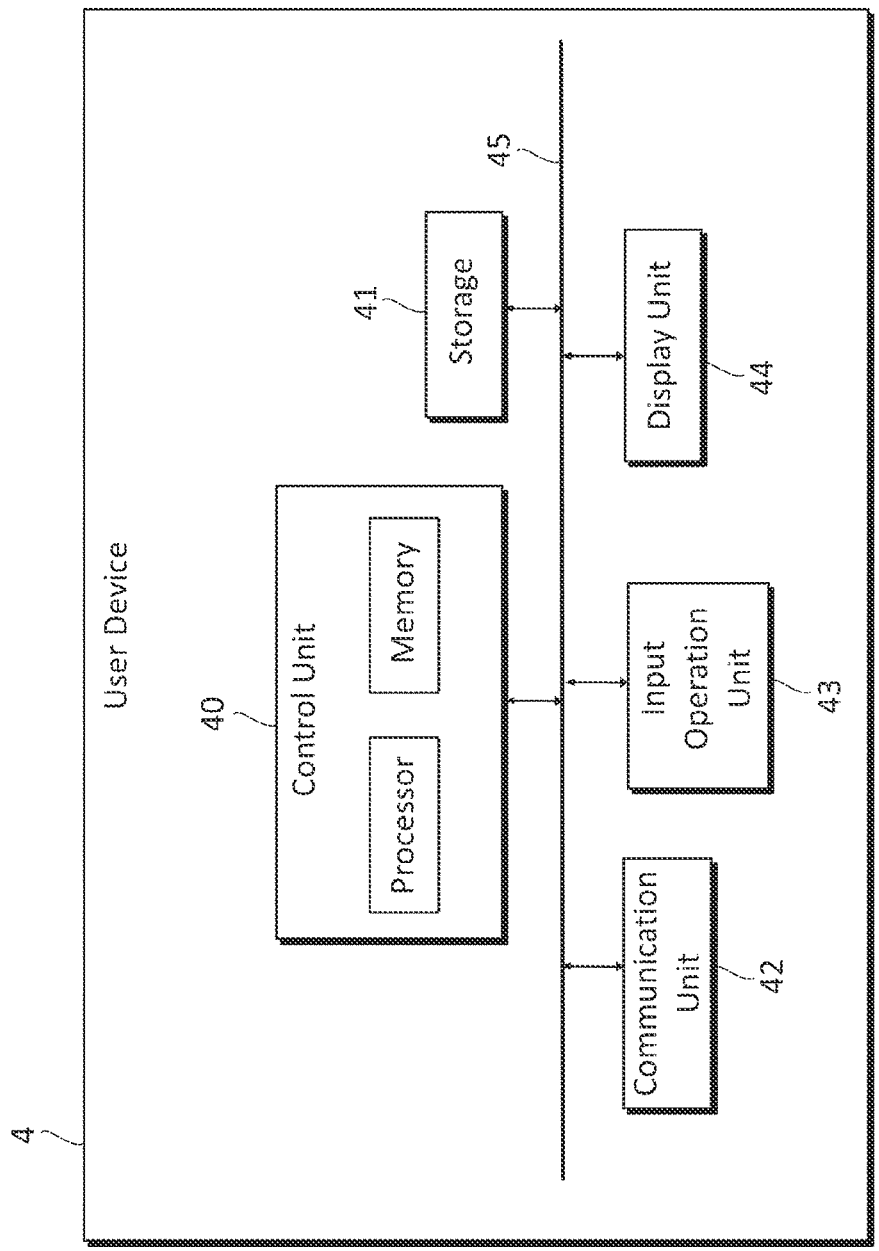
FIG. 4 illustrates an example hardware configuration of a user device.

Next, the hardware configuration of the user device 4 will be described below with reference to FIG. 4. The user device 4 maybe, for example, a personal computer, smartphone, tablet or wearable device (e.g., AR glasses or head mounted display) worn by a user U of the user device 4. The user device 4 has a web browser. The user device 4 includes but not limited to a control unit 40, a storage 41, a communication unit 42, an input operation unit 43, and a display unit 44. These elements are connected to a communication bus 45.

The control unit 40 includes a memory and a processor. The memory is configured to store computer readable instructions (programs). For example, the memory may include one or more ROMs and one or more RAMs. The processor may include at least one of CPU, MPU and GPU, for example.

The storage 41 may include at least one of a HDD, SSD, flash memory, etc., and is configured to store programs and various data. The communication unit 42 is configured to connect the user device 4 to the communication network 6. The communication unit 42 includes a wireless communication module and/or a wired communication module. The input operation unit 43 is, for example, a touch panel, mouse, and/or keyboard, and is configured to accept input operations of the user U and to generate operation signals in response to the input operations of the user U. The display unit 44 includes, for example, a video display and a video display circuitry. A video display screen showing the video data of the camera 2 and a map may be displayed on the display unit 44. The user U may be, for example, a supervisor of a construction company who remotely supervises conditions at a construction site.

The external server 5 is configured to provide map information to the user device 4 via the communication network 6. Specifically, the external server 5 receives the position information of the respective cameras 2a to 2c from the user device 4 and then sends a map covering the area where the cameras 2a to 2c exist to the user device 4. The map provided by the external server 5 maybe, for example, a Google Map provided by Google LLC, headquartered in California, USA.

The video processing system 1 according to the present embodiment allows real-time monitoring of the situations at a construction site remotely from the user device 4. The video processing system 1 also allows real-time monitoring of situations at any work site other than a construction site remotely from user device 4.

(Digital Image Stabilization)

Next, with reference to FIGS. 5 to 7, digital image stabilization, which is digital image processing to electronically suppress blurring of video data captured by the camera 2, will be described below. While a worker T who is holding the camera 2 is moving around the construction site, the video data of the camera 2 will be shaken (camera shake) in conjunction with the shaking of the body (e.g., hands) of the worker T. As a result, the video data displayed on the user device 4 is blurred, making it difficult for the user U (e.g., a construction site supervisor) to accurately grasp the situations at the construction site from a remote location. Rather, the blurring of the video data may cause visually induced motion sickness (VIMS) for the user U. Therefore, it is preferable that digital image stabilization be performed on the video data while the worker T is moving. In the present embodiment, it is assumed that the camera 2 performs digital image stabilization, but does not perform optical image stabilization to adjust the vertical position (the direction perpendicular to the optical axis direction) of the optical system 26 such as lens or the image sensor 27.

Figure 5:
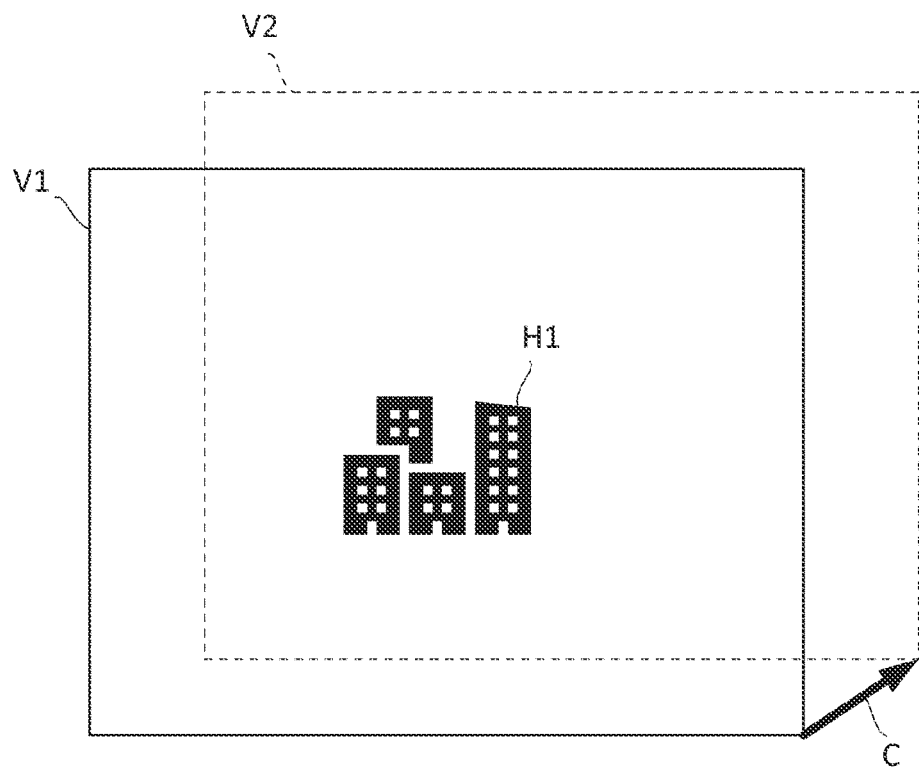
FIG. 5 illustrates how the field view of the camera changes due to camera shaking.
Figure 6:
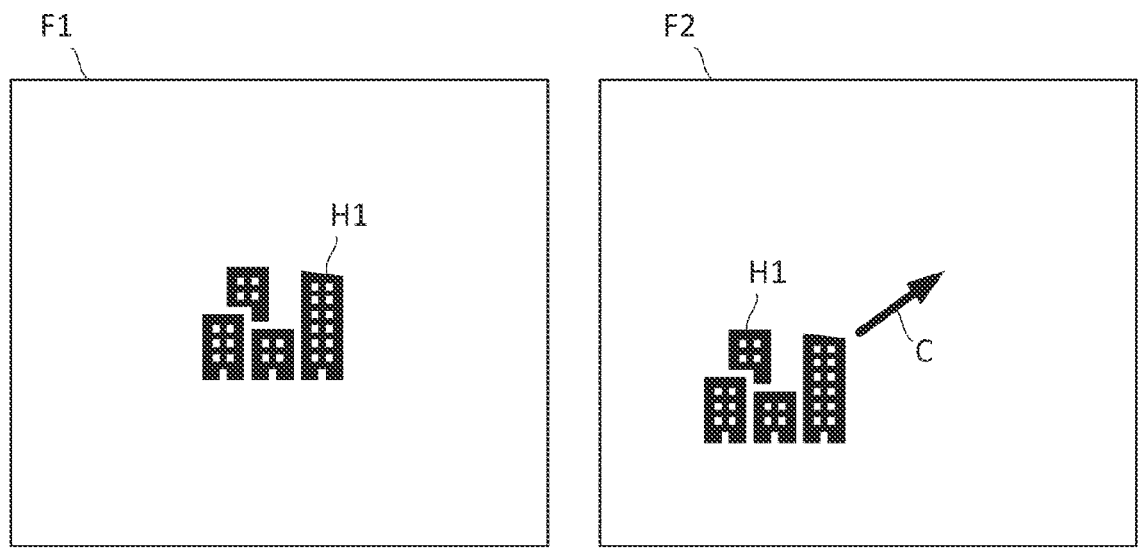
FIG. 6 illustrates the principle of digital image stabilization.

As shown in FIG. 5, the field of view V of the camera 2 shall fluctuate from V1 to V2 in conjunction with the shaking of the body of worker T. Here, it is assumed that an object H1 in the fields of view V1 and V2 of the camera 2 is fixedly positioned and does not move. In this case, the position of the object H1 displayed in frame F1 corresponding to field of view V1 is different from the position of the object H1 displayed in frame F2 corresponding to field of view V2. Thus, blurring (positional variation of the object) occurs in the video data according to the time variation of the field of view V of the camera 2.

In digital image stabilization, the control unit 20 estimates variation amount C in the field of view V of the camera 2 based on the movement data acquired from inertial sensor 23. The variation amount C has the movement direction and distance of the field of view V. In this example, the control unit 20 estimates the variation amount C between the fields of view V1 and V2, based on the movement data acquired from the inertial sensor 23. After estimating the variation amount C of the field of view V, the control unit 20 shifts (translates) the position of the pixel data group of the frame F2 by the variation amount C, as shown in FIG. 6. Thus, after digital image stabilization is performed on the video data, the position of the object H1 displayed in the frame F1 and the position of the object H1 displayed in the frame F2 will match each other. Thus, it is possible to suppress blurring of the video data.

Figure 7:
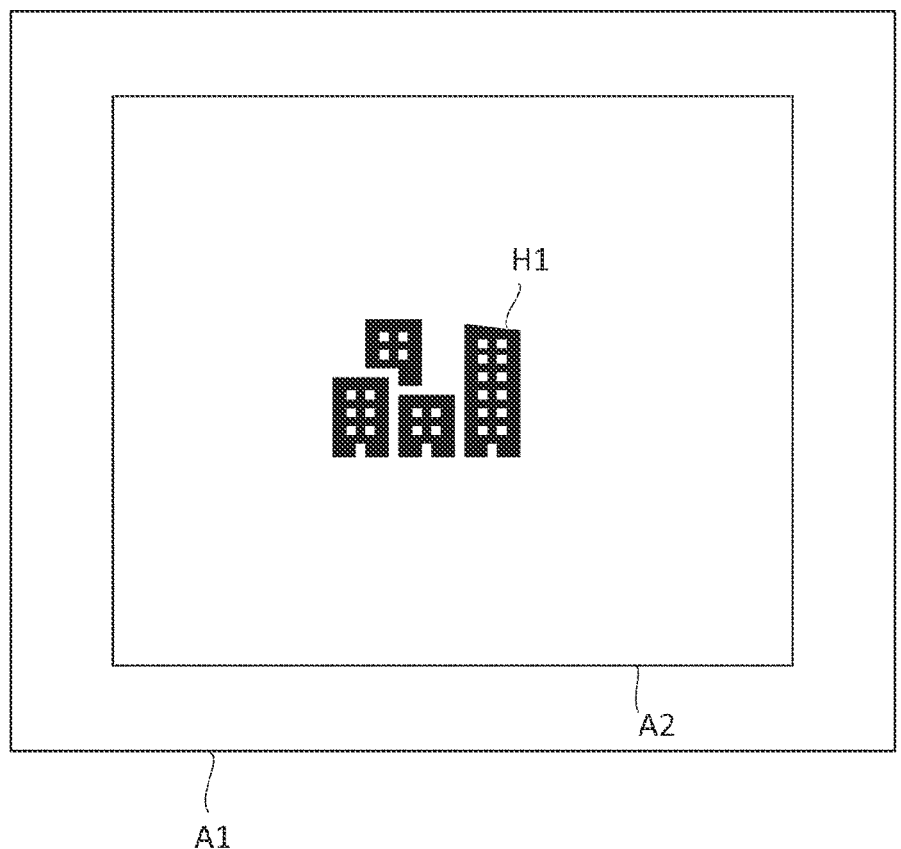
FIG. 7 illustrates how digital image stabilization narrows the angle view of the camera.

Since digital image stabilization shifts the pixel data group of a frame in accordance with the variation amount C of the field of view V, as shown in FIG. 7, the angle of view A2 of the camera 2 after digital image stabilization becomes smaller than the angle of view A1 of the camera 2 before digital image stabilization. That is, the angle of view A2 of the camera 2 is set appropriately according to the maximum value of the variation amount C of the field of view V. When digital image stabilization is performed on the video data, the video data of the angle of view A2 is transmitted to the server 3 and then displayed on the display unit 28 of the camera 2.

(Digital Zoom)

Next, with reference to FIGS. 8 and 9, the digital zoom, a digital image processing that electronically enlarges an area in the field of view of the camera 2, will be described below. If the user U wants to focus on a work area at a construction site, it is preferable that the work area be enlarged through the digital zoom function. In the present embodiment, it is assumed that the camera 2 performs digital zoom (electronic zoom), but does not perform optical zoom to adjust the focal distance between the lens and the image sensor.

Figure 8:
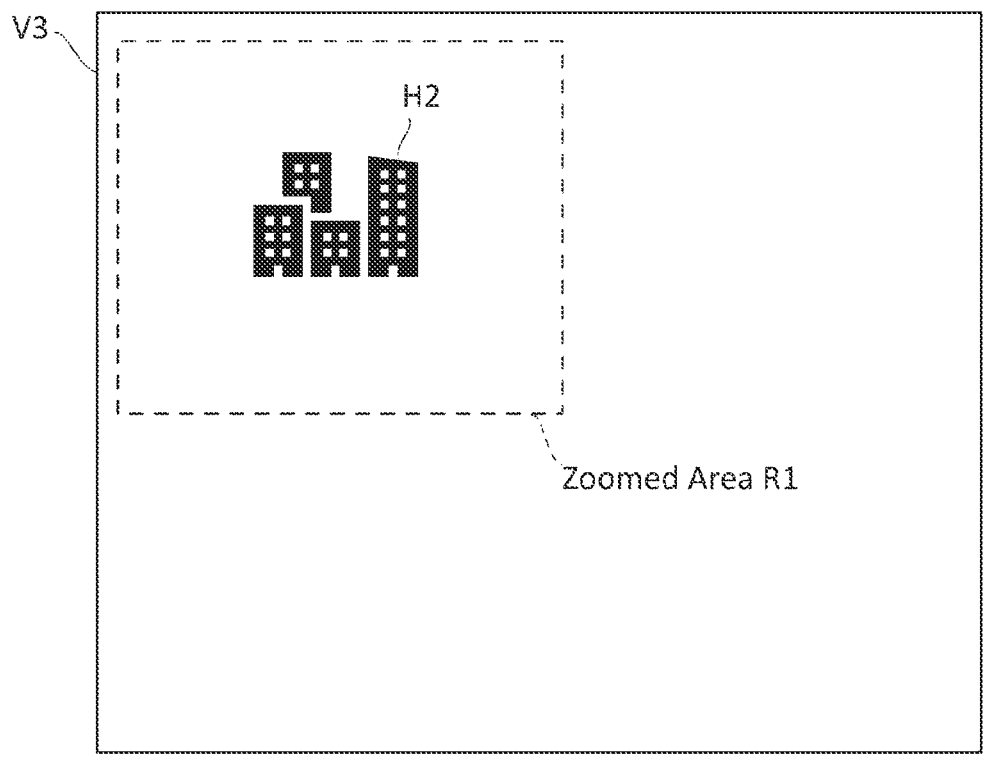
FIG. 8 illustrates a zoomed area that exists within the field view of the camera.
Figure 9:
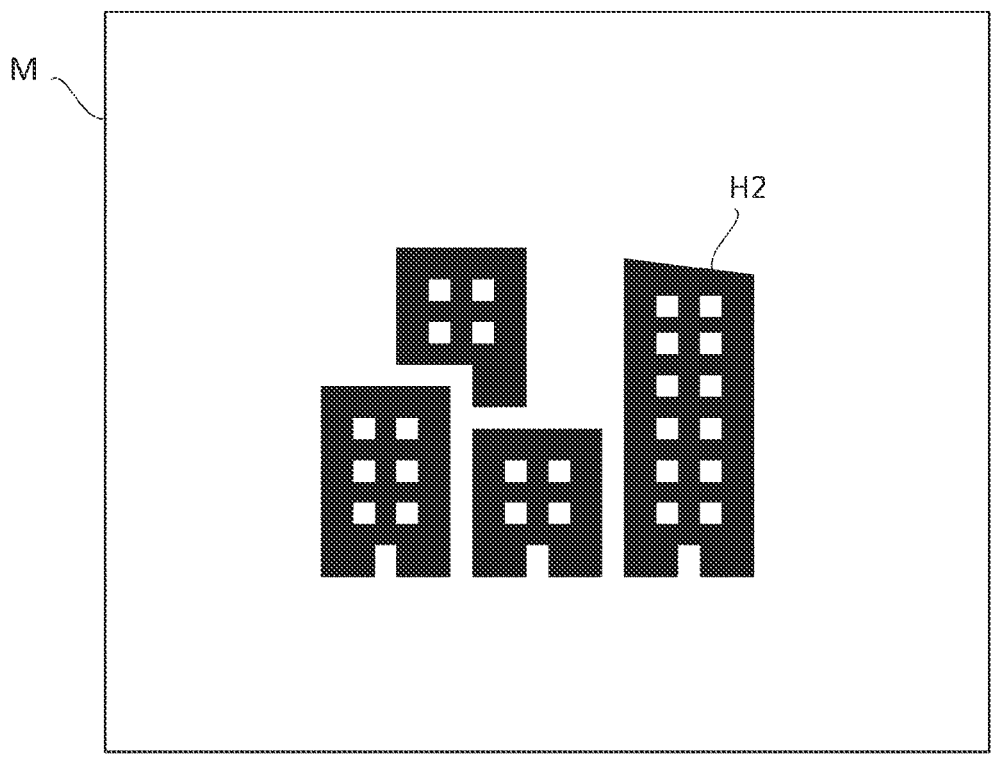
FIG. 9 illustrates video data where the zoomed area is enlarged through digital zoom.

As shown in FIG. 8, it is assumed that an object H2, which exists within the field of view V3 of the camera 2, is enlarged by digital zoom. In this case, the control unit 20 acquires the video data (each frame) corresponding to the field of view V3, and then extracts from the acquired video data a group of pixel data that constitutes a zoomed area R1 including the object H2 (in other words, the group of pixel data in the video data other than the zoomed area R1 is trimmed). The control unit 20 then generates video data where the zoomed area R1 is enlarged (zoomed in). Here, as shown in FIG. 9, the size of the video data where the zoomed area R1 is enlarged matches the size of the original video data corresponding to the field of view V3. Thus, it is possible to enlarge a part of the area within the field of view V3 (in this example, the zoomed area R1 including the object H2) through the digital zoom function. When digital zoom is performed on the video data, the video data where the zoomed area R1 is enlarged is transmitted to the server 3 and then displayed on the display unit 28 of the camera 2.

(Digital Distortion Correction)

Figure 10:
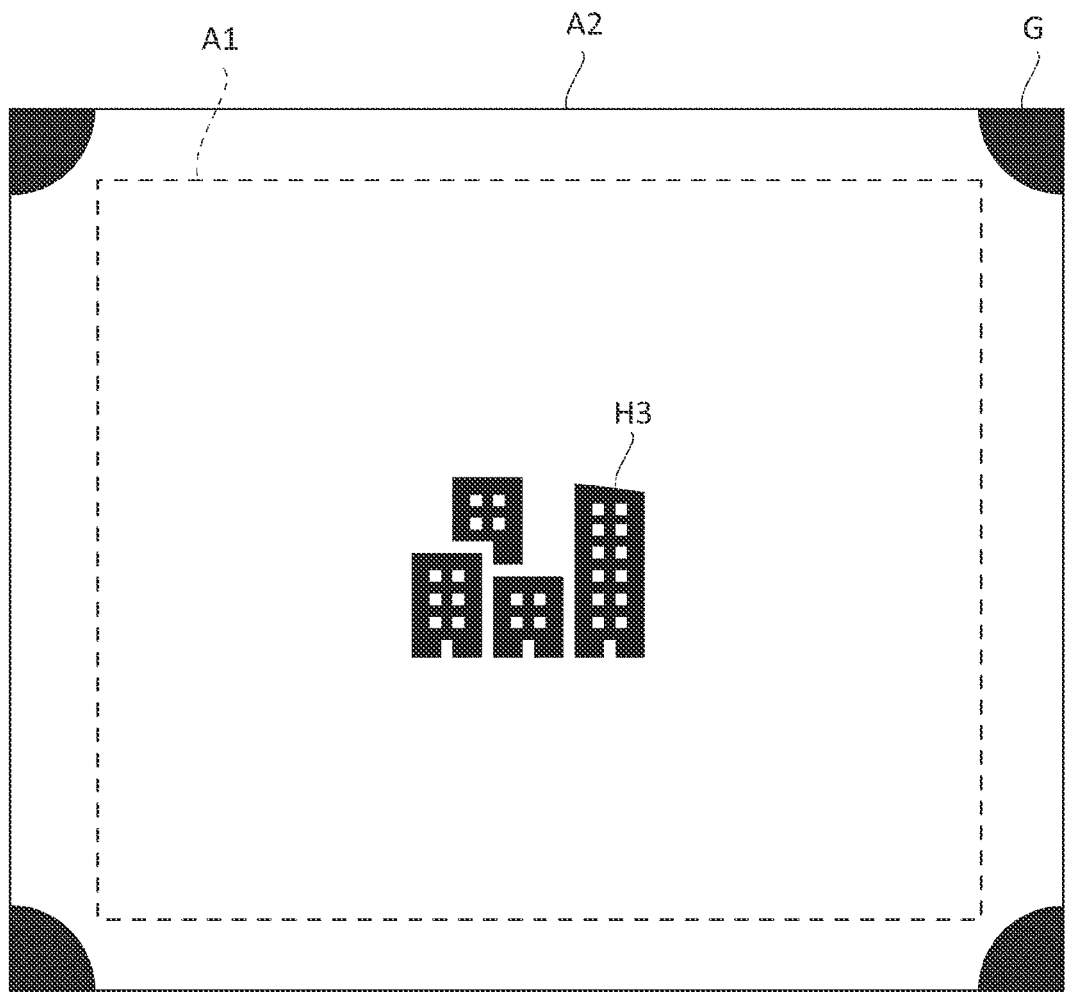
FIG. 10 illustrates digital distortion correction.

Next, with reference to FIG. 10, the digital distortion correction will be described below. The digital distortion correction is a digital image processing to electronically correct distortion, chromatic aberration, diffraction, and vignetting, which are caused by the lens of the camera 2. As shown in FIG. 10, in the video data (each frame) composed by all pixels of the image sensor 27, distortion G occurs around the four corners of the video data. The distortion G such as distortion, chromatic aberration, diffraction and vignetting is caused by the lens. Here, the angle of view of the video data composed by all pixels of the image sensor 27 is A2. When digital distortion correction is not performed, the video data of the angle of view A1 is extracted from the video data of the angle of view A2 (A1<A2). In other words, a group of pixel data in the peripheral region including distortion G is trimmed. Thus, when digital distortion correction is not performed, the video data of the angle of view A1 is transmitted to the server 3 and then displayed on the display unit 28.

On the other hand, when the control unit 20 performs digital distortion correction on the video data of the angle of view A2 (in other words, the video data composed of all pixels of the image sensor 27), the distortion G caused by the lens is removed or reduced from the video data. Thus, the video data with an angle of view A2 larger than the angle of view A1 can be transmitted to the server 3. The digital distortion correction can increase the angle of view of the video data sent to the server 3. As such, the digital distortion correction may be referred to as digital wide-angle correction in the following description.

Figure 11:
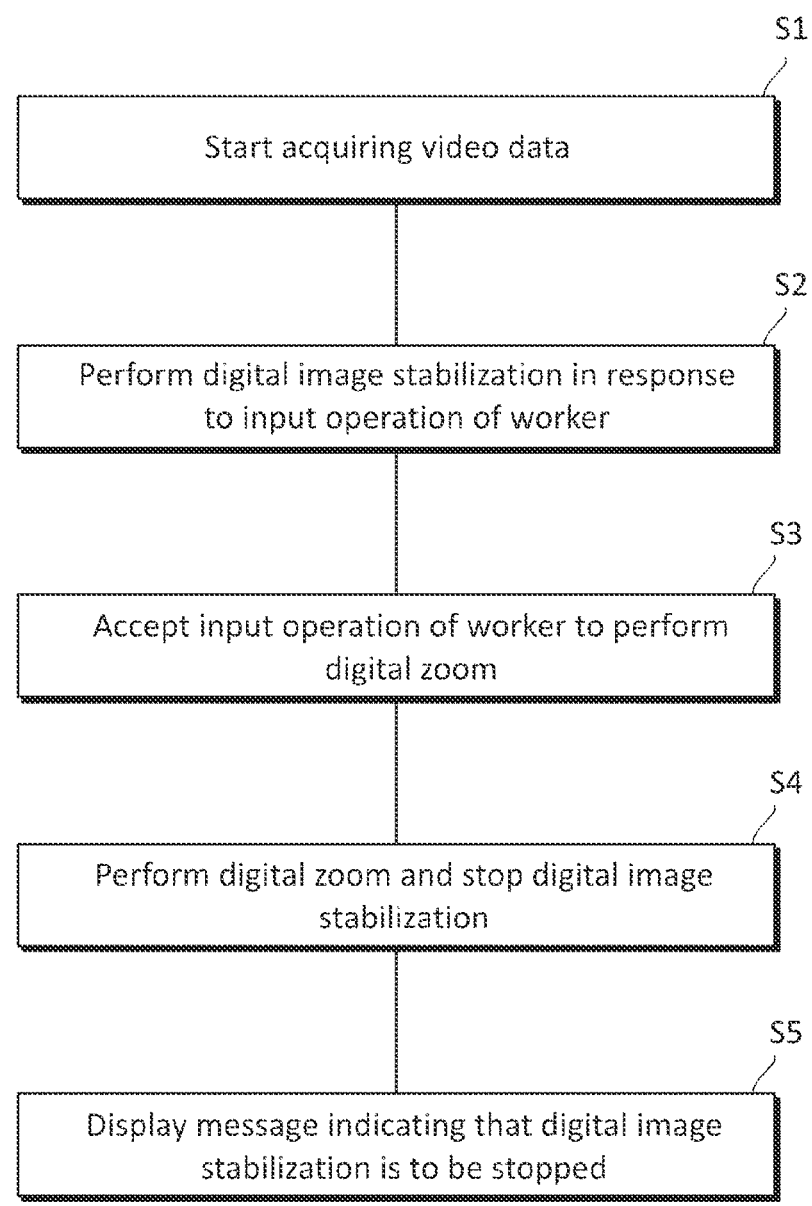
FIG. 11 is a flowchart for explaining a series of processes of stopping digital image stabilization when performing digital zoom.
Figure 13:
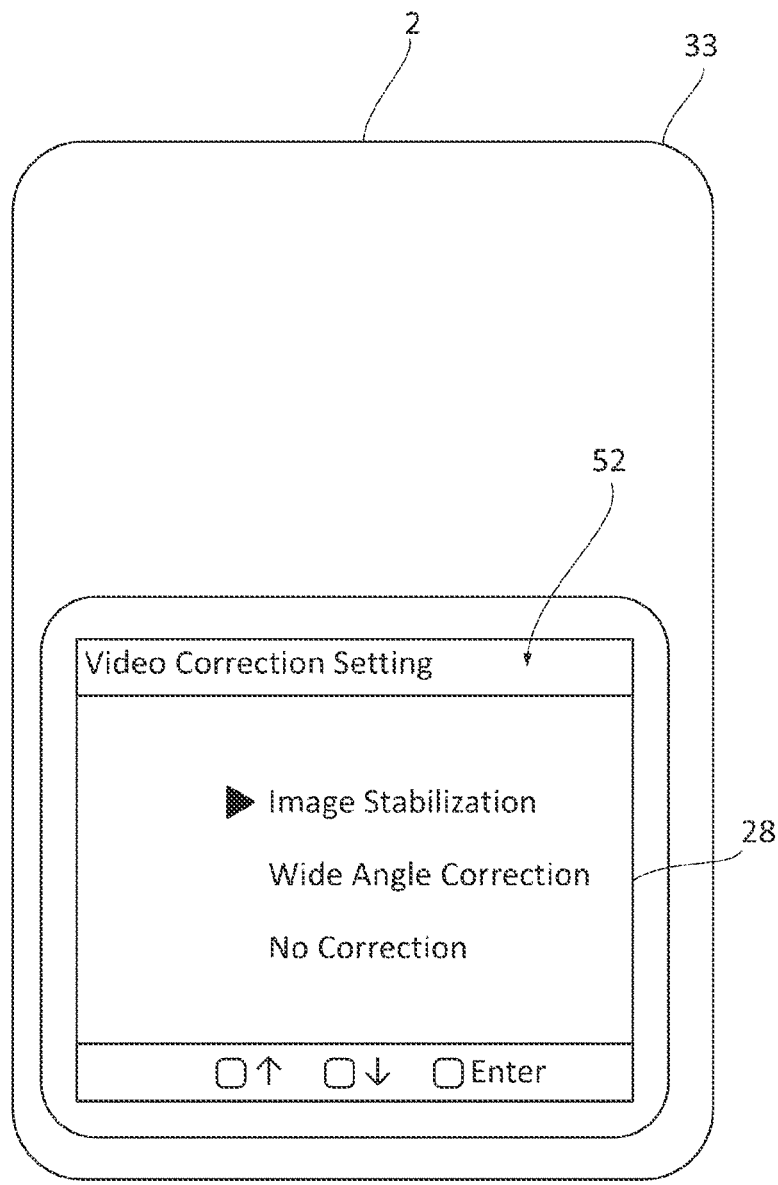
FIG. 13 illustrates an example of a video correction setting screen displayed on the display unit of the camera.
Figure 14:
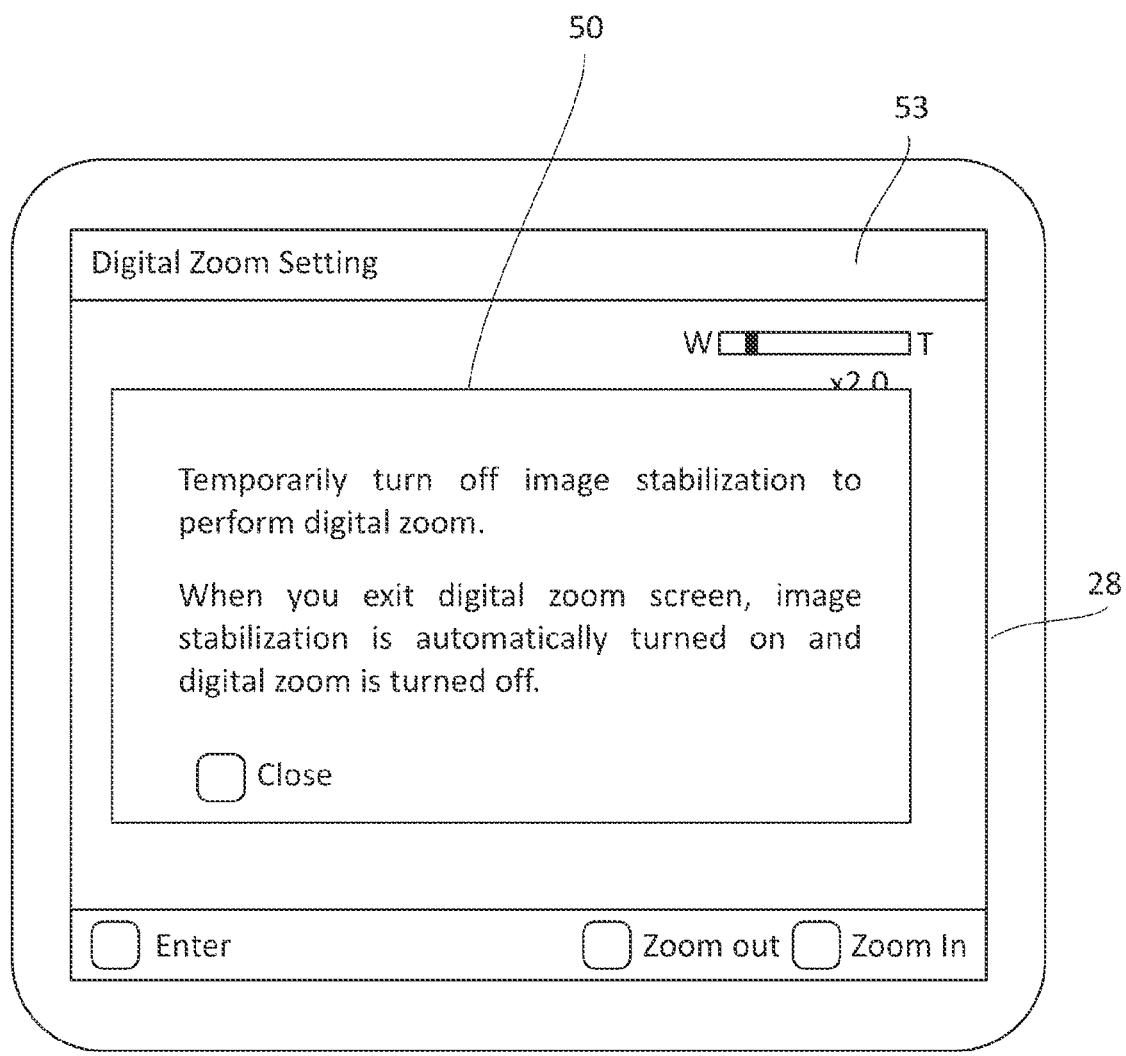
FIG. 14 illustrates an example message indicating that the digital image stabilization is to be stopped.

Example 1: Stopping Digital Image Stabilization in Response to the Execution of Digital Zoom Next, with reference to FIGS. 11 to 14, a series of processes of stopping digital image stabilization in response to the execution of digital zoom will be described below. FIG. 11 is a flowchart for explaining a series of processes of stopping digital image stabilization in response to the execution of digital zoom. FIG. 12 illustrates an example of the display unit 28 on the back of the camera 2. FIG. 13 illustrates an example of a video correction setting screen 52 displayed on the display unit 28 of the camera 2. FIG. 14 illustrates an example of a message 50 indicating that digital image stabilization is to be stopped.

As shown in FIG. 11, in step S1, the control unit 20 of the camera 2 (see FIG. 2) starts acquiring video data showing the environment surrounding the camera 2 through shooting. For example, the acquisition of video data is started in response to the input operation of the worker T to the camera 2. The acquired video data is transmitted to the server 3 through the communication network 6 and then displayed on the display unit 28 on the back of the camera 2 (see FIG. 12). Next, in step S2, the control unit 20 performs digital image stabilization in response to the input operation of the worker T. Specifically, as shown in FIG. 13, digital image stabilization is performed by the control unit 20 when the worker T selects the item "Image Stabilization" on the display unit 28 while the video correction setting screen 52 is displayed.

In step S3, the control unit 20 accepts the input operation of the worker T to perform the digital zoom. Specifically, an area in the field of view of the camera 2 can be enlarged and displayed when a control button provided on the housing 33 of the camera 2 is operated by the worker T. While the worker T is operating the digital zoom, a digital zoom setting screen 53 may be displayed on the display unit 28 (see FIG. 14). The worker T can, for example, set the digital zoom factor between 1× and 8×. A zoom magnification meter indicating the magnification of the digital zoom may be displayed on the digital zoom setting screen 53.

Next, in step S4, control unit 20 performs digital zoom and stops digital image stabilization. Specifically, video data where a zoomed area is enlarged in response to the execution of digital zoom (hereinafter referred to as "zoomed video") is sent to the server 3 via the communication network 6 and then displayed on the display unit 28 in real time. The zoomed video may be displayed within the area of the digital zoom setting screen 53. The zoom magnification meter displayed on the digital zoom setting screen 53 may be changed in accordance with changes in the magnification of the digital zoom.

In step S5, the control unit 20 displays the message 50 on the digital zoom setting screen 53, which indicates that digital image stabilization is to be stopped (see FIG. 14). The process of step S5 may be performed at the same time as the process of step S4 or before the process of step S4. In addition, a message indicating that digital image stabilization is to be stopped may be visually and/or audibly presented to the worker T. For example, an audio message indicating that digital image stabilization is to be stopped may be output from the audio output unit of the camera 2.

According to the present embodiment, digital image stabilization is stopped when digital zoom is performed on video data while digital image stabilization is being performed. Thus, it is possible to suitably prevent a situation where digital image stabilization is performed while digital zoom is being performed. For example, when a part of the area in the field of view is enlarged through the digital zoom function, it is expected that the camera 2 is fixedly positioned in place by a camera tripod or the like. Thus, there is little need to perform digital image stabilization to suppress blurring of the video data. Rather, the execution of both digital zoom and digital image stabilization increases the computational load of the control unit 20 of the camera 2, which may increase the power consumption of the battery 29 and cause delays in the processing of the video data. In particular, the video data may not be displayed smoothly on the user device 4 due to the transmission delay of the video data. In this embodiment, digital image stabilization is stopped when digital zoom is performed, which improves the usability of the camera 2. In particular, the worker T does not need to perform manual operations to stop the digital image stabilization, which reduces the time and effort required for the input operations of the worker T to the camera 2.

According to the present embodiment, when digital image stabilization stops, a notification (visual or audio message) is presented to the worker T that digital image stabilization is to be stopped. Therefore, the worker T can clearly understand that digital image stabilization is stopped.

In this example, digital image stabilization and digital zoom are executed in response to input operations by the worker T (an example of a first user) holding the camera 2. However, these digital image processes may be executed in response to remote input operations by the user U (an example of a second user) operating the user device 4. In this case, an instruction signal indicating digital image stabilization may be sent from the user device 4 to the camera 2 via the server 3. Similarly, an instruction signal indicating digital zoom may be sent from the user device 4 to the camera 2 via the server 3. The camera 2 can perform digital image stabilization and digital zoom according to the instruction signals transmitted from the user device 4. The stop information indicating the stop of digital image stabilization may be sent from the camera 2 to the user device 4 via the server 3. In this case, the user U can clearly understand the stop of digital image stabilization through the stop information sent from the camera 2.

In addition, the control unit 20 may resume digital image stabilization after digital zoom is terminated according to the input operation of the worker T.

Figure 15:
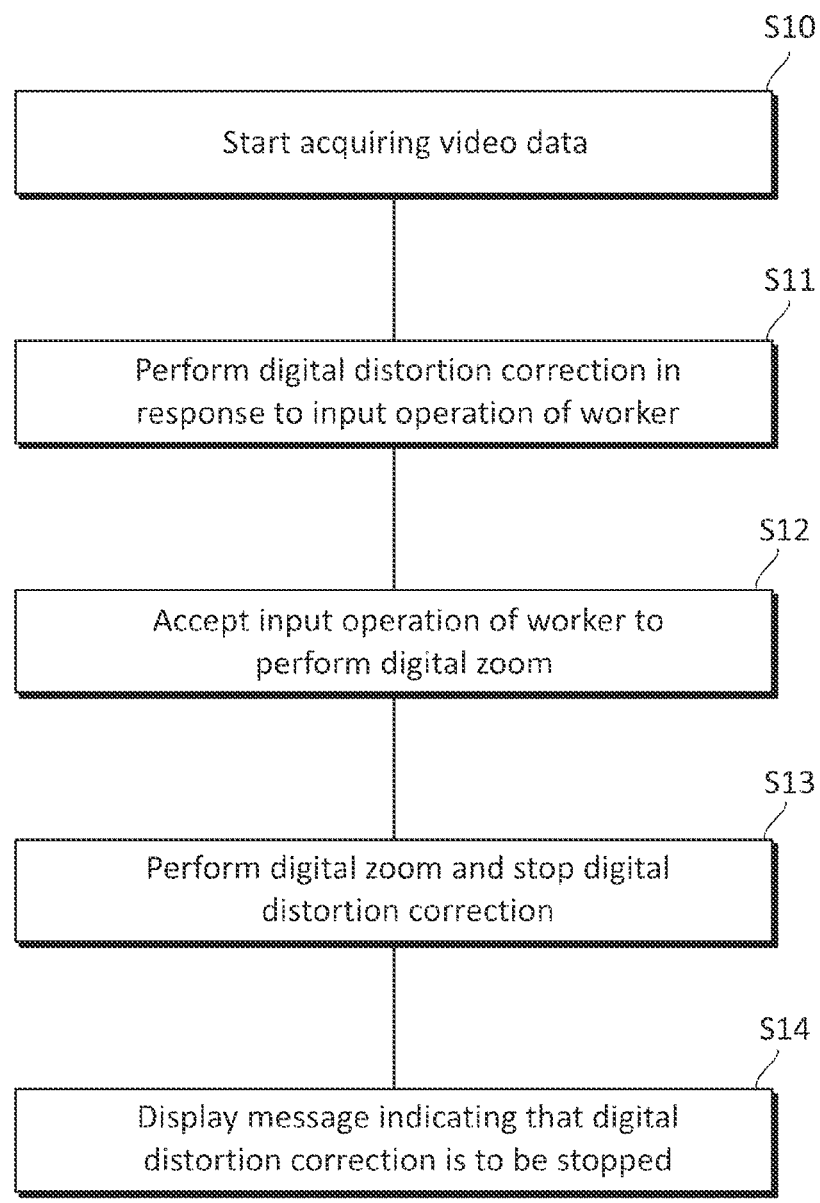
FIG. 15 is a flowchart for explaining a series of processes of stopping digital distortion correction when performing digital zoom.
Figure 16:
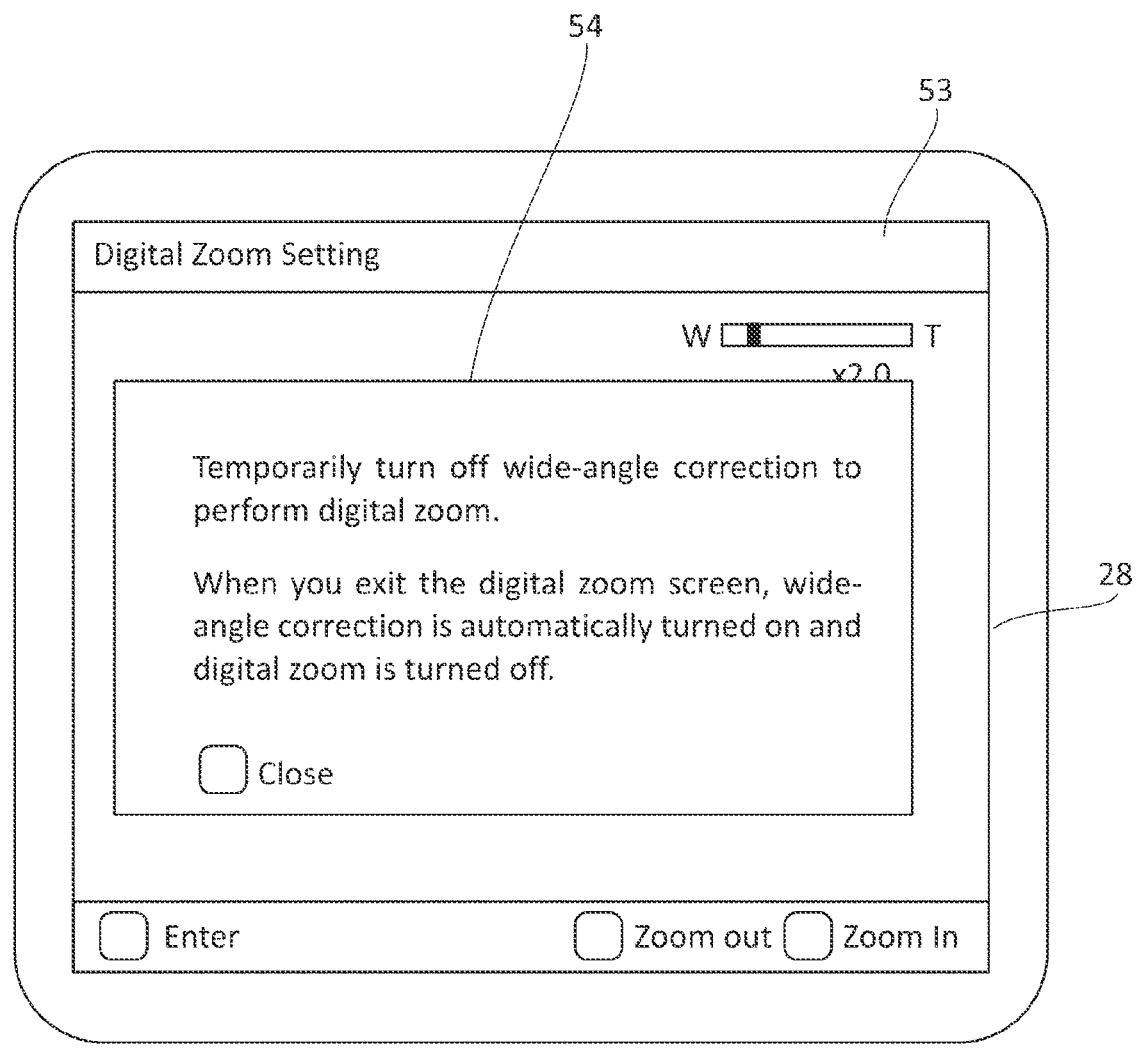
FIG. 16 illustrates an example message indicating that the digital distortion correction (digital wide-angle correction) is to be stopped.

Example 2: Stopping Digital Distortion Correction in Response to the Execution of Digital Zoom Next, with reference to FIGS. 15 and 16, a series of processes of stopping digital distortion correction in response to the execution of digital zoom will be described below. FIG. 15 is a flowchart to explain a series of processes of stopping digital distortion correction in response to the execution of digital zoom. FIG. 16 illustrates an example of a message 54 indicating the stop of digital distortion correction (digital wide-angle correction).

As shown in FIG. 15, in step S10, the control unit 20 starts acquiring video data showing the environment surrounding the camera 2 through shooting. In step S11, the control unit 20 performs digital distortion correction (digital wide-angle correction) in response to the input operation of the worker T. Specifically, as shown in FIG. 13, digital distortion correction is performed by the control unit 20 when the worker T selects the item "Wide Angle Correction" while the video correction setting screen 52 is displayed on the display unit 28.

In step S12, the control unit 20 accepts the input operation of the worker T to perform the digital zoom. In step S13, the control unit 20 performs digital zoom and stops digital distortion correction. Specifically, the zoomed videos are transmitted to the server 3 via the communication network 6 and then displayed on the display unit 28 in real time. The zoomed video may be displayed within the area of the digital zoom setting screen 53.

In step S14, the control unit 20 displays the message 54 on the digital zoom setting screen 53, which indicates that digital distortion correction is to be stopped (see FIG. 16). The process of step S14 may be performed at the same time as the process of step S13 or before the process of step S13. In addition, a message indicating the stop of digital distortion correction may be visually and/or audibly presented to the worker T. For example, an audio message indicating that digital distortion correction is to be stopped may be output from the audio output unit of camera 2.

According to the present embodiment, digital distortion correction is stopped when digital zoom is performed on video data while digital distortion correction is being performed. Thus, it is possible to suitably prevent a situation where digital distortion correction is performed while digital zoom is being executed. For example, if a part of area in the field of view is enlarged through the digital zoom function, there is little need to perform digital distortion correction (digital wide-angle correction) to increase the angle of view of the camera 2. Rather, the execution of both digital zoom and digital distortion correction increases the computational load of the control unit 20 of the camera 2, which may increase the power consumption of the battery 29 and cause delays in the processing of the video data. In particular, the video data may not be displayed smoothly on the user device 4 due to the transmission delay of the video data. In this embodiment, digital distortion correction is stopped when digital zoom is performed, which improves the usability of the camera 2. In particular, the worker T does not need to perform a manual operation to stop the digital distortion correction, which reduces the time and effort required for the input operations of the worker T to the camera 2.

In addition, the control unit 20 may resume digital distortion correction after digital zoom is terminated according to the input operation of the worker T.

Figure 17:
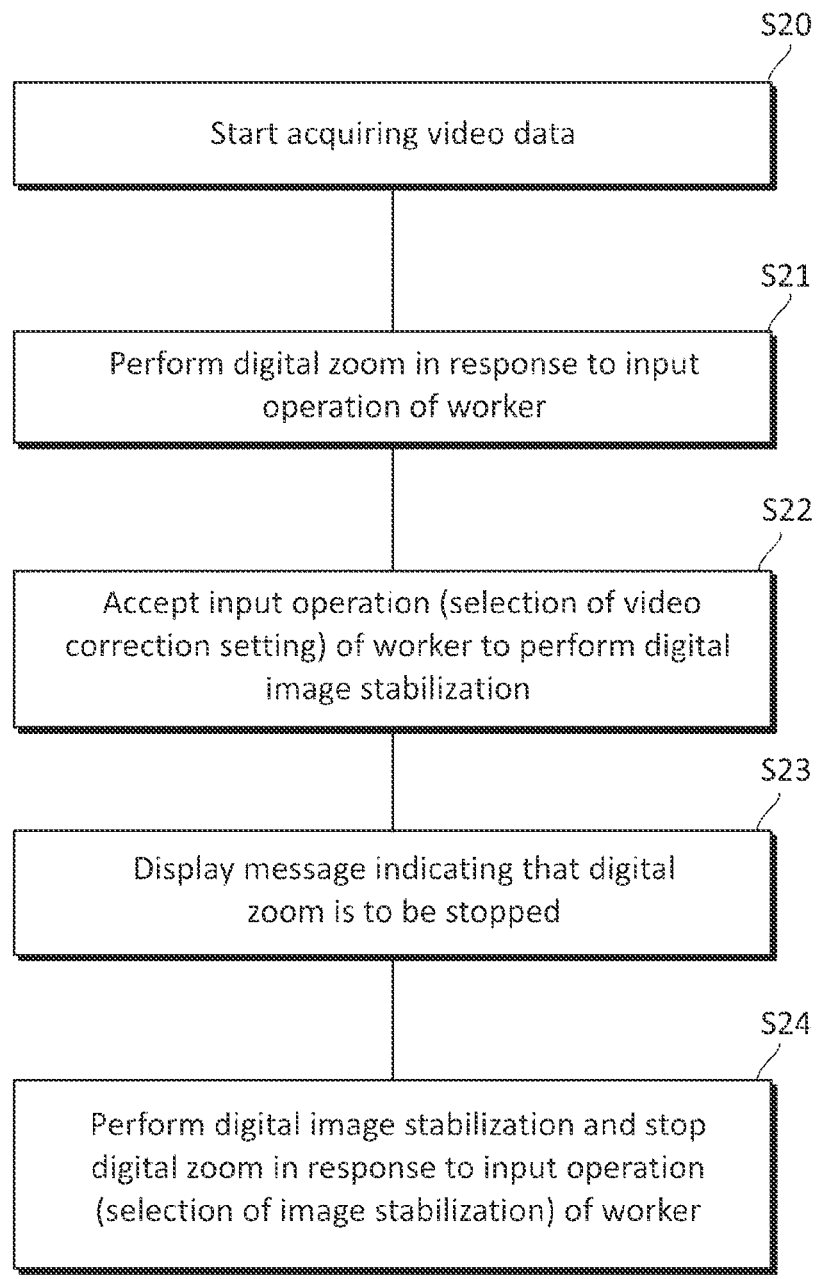
FIG. 17 is a flowchart for explaining a series of processes of stopping digital zoom when performing digital image stabilization.
Figure 18:
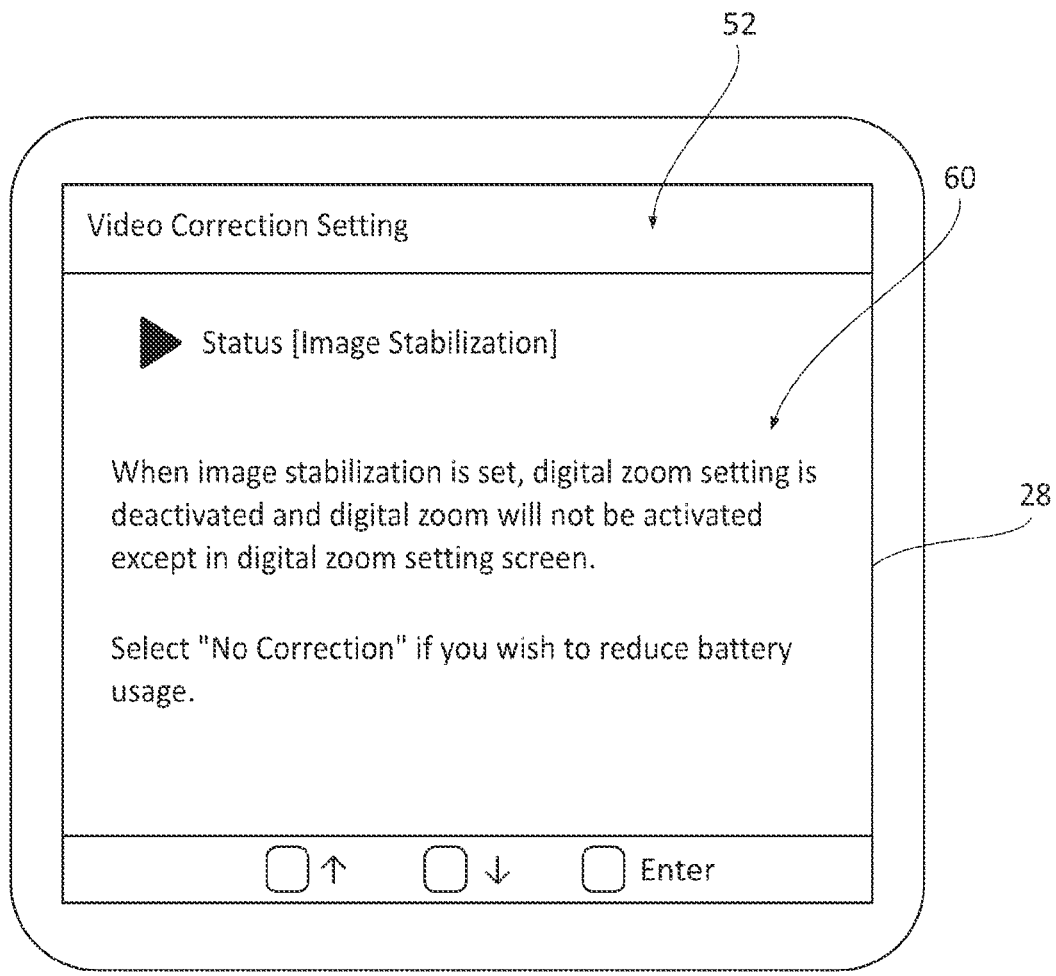
FIG. 18 illustrates an example message indicating that the digital zoom is to be stopped.

Example 3: Stopping the Digital Zoom in Response to the Execution of Digital Image Stabilization Next, with reference to FIGS. 17 and 18, a series of processes of stopping digital zoom in response to the execution of digital image stabilization will be described below. FIG. 17 is a flowchart to explain a series of processes of stopping digital zoom in response to the execution of digital image stabilization. FIG. 18 illustrates an example of a message 60 indicating that digital zoom is to be stopped.

As shown in FIG. 17, in step S20, the control unit 20 starts acquiring video data showing the environment surrounding the camera 2 through shooting. In step S21, the control unit 20 performs digital zoom in response to an input operation by the worker T (e.g., an input operation to an operation button on the housing 33 of the camera 2). In step S22, the control unit 20 accepts the input operation of the worker T to perform digital image stabilization. Specifically, as shown in FIG. 13, the control unit 20 accepts an input operation to perform digital image stabilization when the worker T selects the "Image Stabilization" item while the video correction setting screen 52 is displayed on the display unit 28.

In step S23, the control unit 20 displays the message 60 indicating that digital zoom is to be stopped on the video correction setting screen 52 (see FIG. 18). In step S24, the control unit 20 performs digital image stabilization and stops digital zoom in response to the input operation by the worker T. Specifically, when the worker T selects the "Status [Image Stabilization]" or "Enter" item displayed on the video correction setting screen 52 as shown in FIG. 18, the control unit 20 performs digital image stabilization and stops digital zoom.

According to the present embodiment, the digital zoom process is stopped when digital image stabilization is performed on the video data while digital zoom is being performed. Thus, it is possible to suitably prevent a situation where digital zoom processing is performed while digital image stabilization is being performed. For example, while the worker T is moving, the user U operating the user device 4 cannot accurately grasp the situation of the surrounding environment at a construction site, with the video data where a part of areas of the surrounding environment in the field of view are enlarged. For this reason, it is not preferable that the digital zoom function is activated. Furthermore, the execution of both digital image stabilization and digital zoom increases the computational load of the control unit 20 of the camera 2, which may increase the power consumption of the battery 29 of the camera 2 and cause delays in the processing of the video data. In particular, the video data may not be displayed smoothly on the user device 4 due to processing delays of the video data. In this embodiment, the digital zoom function stops when digital image stabilization is performed (in other words, the digital zoom function stops when the user moves). Thus, it is possible to improve the usability of the camera 2. In particular, the worker T does not need to perform manual operations to stop the digital zoom, which reduces the effort of the input operations of the worker T to the camera 2.

Figure 19:
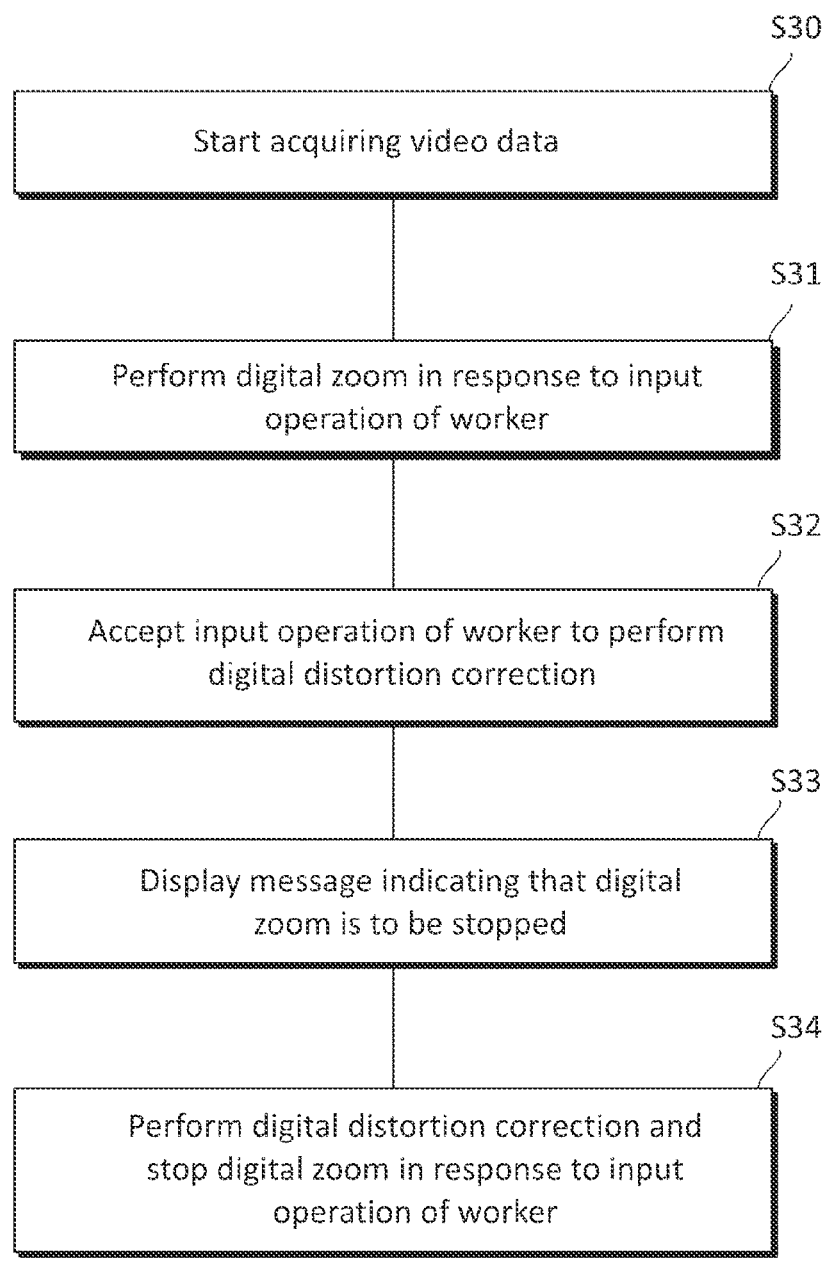
FIG. 19 is a flowchart for explaining a series of processes of stopping digital zoom when performing digital distortion correction.

Example 4: Stopping Digital Zoom in Response to the Execution of Digital Distortion Correction Next, a series of processes of stopping digital zoom in response to the execution of digital distortion correction will be described below with reference to FIG. 19. FIG. 19 is a flowchart to explain a series of processes of stopping digital zoom in response to the execution of digital distortion correction.

As shown in FIG. 19, in step S30, the control unit 20 starts acquiring video data showing the environment surrounding the camera 2 through shooting. In step S31, the control unit 20 executes digital zoom in response to an input operation by the worker T (e.g., an input operation to an operation button on the housing 33 of the camera 2). In step S32, the control unit 20 accepts the input operation of the worker T to perform digital distortion correction (digital wide-angle correction).

In step S33, the control unit 20 displays a message on the display unit 28 indicating that digital zoom is to be stopped. In step S34, the control unit 20 performs digital distortion correction and stops digital zoom in response to the input operation by the worker T.

According to this example, it is possible to suitably prevent a situation where digital zoom is performed while digital distortion correction is being performed. For example, if digital distortion correction is performed to widen the angle of view of the camera 2, it is not necessary to enlarge a certain area in the field of view through the digital zoom function. Rather, the execution of both digital zoom and digital distortion correction increases the computational load of the control unit 20 of the camera 2, which may increase the power consumption of the battery 29 of the camera 2 and cause delays in the processing of video data. According to this example, digital zoom is stopped when digital distortion correction is performed. Thus, it is possible to improve the usability of the camera 2. In particular, the worker T does not need to perform manual operations to stop the digital zoom, which reduces the effort of the input operations of the worker T to the camera 2.

Figure 20:
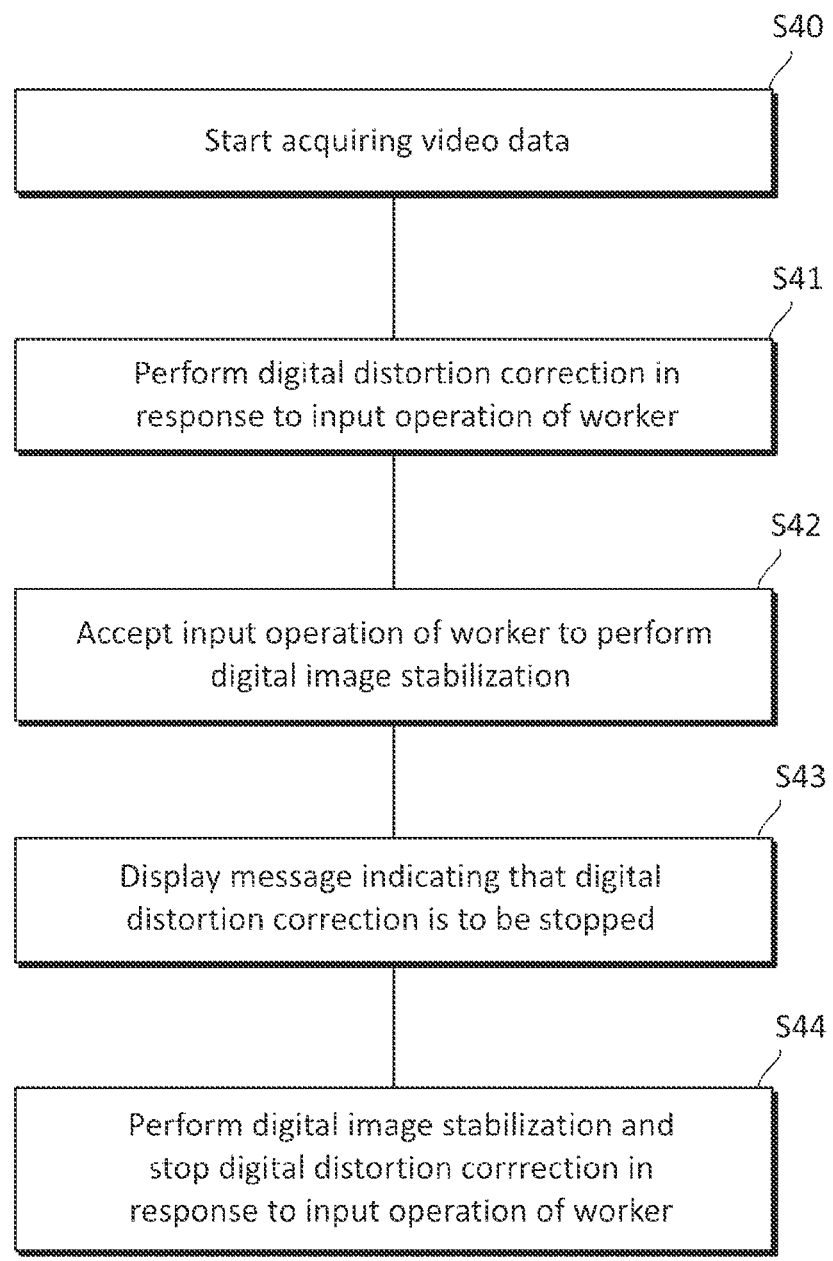
FIG. 20 is a flowchart for explaining a series of processes of stopping digital distortion correction when performing digital image stabilization.

Example 5: Stopping Digital Distortion Correction in Response to the Execution of Digital Image Stabilization Next, a series of processes of stopping digital distortion correction in response to the execution of digital image stabilization will be described below with reference to FIG. 20. FIG. 20 is a flowchart to explain a series of processes of stopping digital distortion correction in response to the execution of digital image stabilization.

As shown in FIG. 20, in step S40, the control unit 20 starts acquiring video data showing the environment surrounding the camera 2 through shooting. In step S41, the control unit 20 performs digital distortion correction in response to the input operation of the worker T. In step S42, the control unit 20 accepts the input operation of the worker T to perform digital image stabilization.

In step S43, the control unit 20 displays a message on the display unit 28 indicating that digital distortion correction is to be stopped. In step S44, the control unit 20 performs digital image stabilization and stops digital distortion correction in response to the input operation of the worker T.

According to this example, it is possible to suitably prevent a situation where digital distortion correction is performed while digital image stabilization is being performed. For example, there is little need for digital distortion correction to widen the angle of view of the camera 2 when digital image stabilization, which in principle narrows the angle of view of the camera 2, is performed. Rather, the execution of both digital distortion correction and digital image stabilization increases the computational load of the control unit 20 of the camera 2, which may increase the power consumption of the battery 29 of the camera 2 and cause delays in the processing of the video data. According to this example, digital distortion correction is stopped when digital image stabilization is performed, thus improving the usability of the camera 2. In particular, the worker T does not need to perform a manual operation to stop the digital distortion correction, which reduces the time and effort required for the input operations of the worker T to the camera 2.

Figure 21:
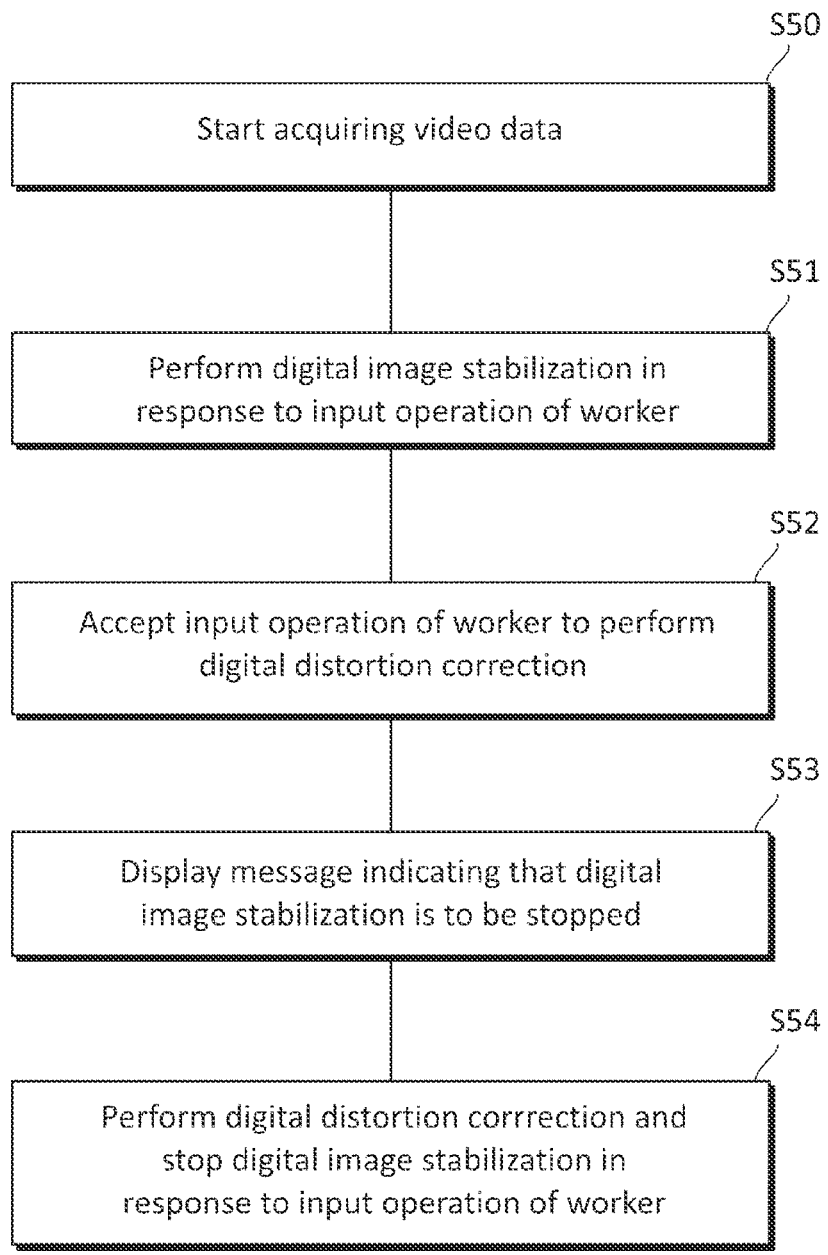
FIG. 21 is a flowchart for explaining a series of processes of stopping digital image stabilization when performing digital distortion correction.

Example 6: Stopping Digital Image Stabilization in Response to Execution of Digital Distortion Correction Next, a series of processes of stopping digital distortion correction in response to the execution of digital image stabilization will be described below with reference to FIG. 21. FIG. 21 is a flowchart to explain a series of processes of stopping digital image stabilization in response to the execution of digital distortion correction.

As shown in FIG. 21, in step S50, the control unit 20 starts acquiring video data showing the environment surrounding the camera 2 through shooting. In step S51, the control unit 20 performs digital image stabilization in response to the input operation of the worker T. In step S52, the control unit 20 accepts the input operation of the worker T to perform digital distortion correction.

In step S53, the control unit 20 displays a message on the display unit 28 indicating that the digital image stabilization is to be stopped. In step S54, the control unit 20 performs the digital distortion correction and stops the digital image stabilization in response to the input operation of the worker T.

According to this example, it is possible to suitably prevent a situation where digital image stabilization is performed while digital distortion correction is being performed. For example, there is little need to perform digital image stabilization which in principle narrows the angle of view of the camera 2 when digital distortion correction to widen the angle of view of the camera 2 is performed. Rather, the execution of both digital distortion correction and digital image stabilization increases the computational load of the control unit 20 of the camera 2, which may increase the power consumption of the battery 29 of the camera 2 and cause delays in the processing of the video data. According to this example, digital image stabilization is stopped when digital distortion correction is performed, thus improving the usability of the camera 2. In particular, the worker T does not need to perform manual operations to stop the digital image stabilization, which reduces the time and effort required for the input operations of the worker T to the camera 2.

In the Examples 1 to 6, when one of the two digital image processes is performed on the video data while the other digital image process is being performed, the other digital image process is stopped. Thus, it is possible to suitably prevent a situation where two different digital image processes are performed simultaneously. For example, when two different digital image processing functions are activated, the computational load of the control unit 20 of the camera 2 may increase, resulting in higher power consumption of the battery 29 of the camera 2 and processing delays of video data. Thus, according to the present embodiment, the camera 2 with improved usability can be provided. In particular, the worker T does not need to perform manual operations to stop one of two different digital image processing functions, which reduces the effort of the input operations of the worker T to the camera 2.

Figure 22:
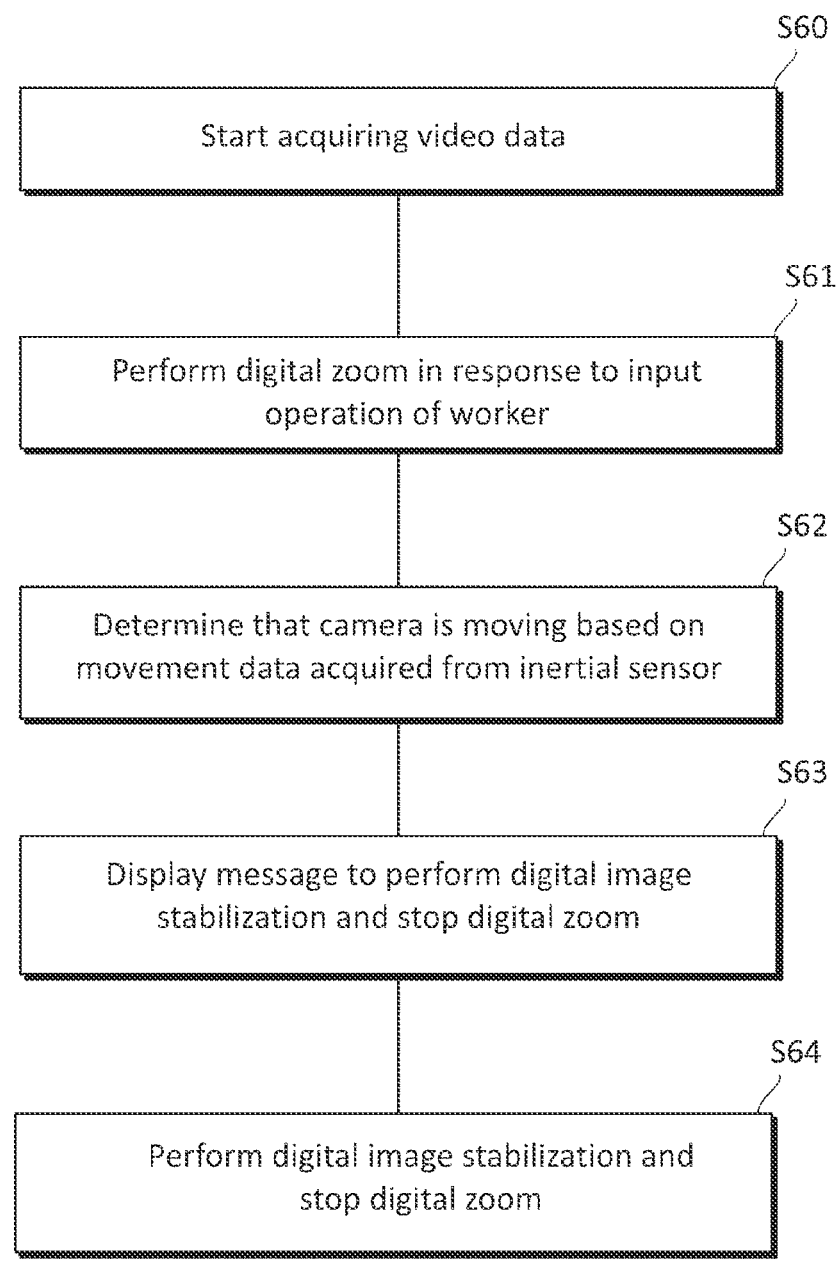
FIG. 22 is a flowchart for explaining a series of processes of performing digital image stabilization and stopping digital zoom in response to camera movement.

Example 7: Automatic Execution of Digital Image Stabilization and Automatic Stop of Digital Zoom Next, with reference to FIG. 22, a series of processes of executing digital image stabilization and stopping digital zoom in response to the movement of the camera 2 will be described below. FIG. 22 is a flowchart to explain a series of processes of executing digital image stabilization and stopping digital zoom in response to the movement of the camera 2. The series of processes shown in FIG. 22 differs from those shown in FIG. 17 in that the digital image stabilization is performed based on the movement data acquired by the inertial sensor 23.

As shown in FIG. 22, in step S60, the control unit 20 starts acquiring video data indicating the environment surrounding the camera 2. In step S61, the control unit 20 performs digital zoom in response to the input operation of the worker T. In step S62, the control unit 20 determines that the camera 2 is moving based on the movement data (in particular, acceleration data) acquired from the inertial sensor 23. In step S63, the control unit 20 visually and/or audibly presents to the worker T a message to perform digital image stabilization and stop digital zoom in response to the determining that the camera 2 is moving. For example, the message may be displayed on the display unit 28. In step S64, the control unit 20 performs digital image stabilization and stops digital zoom.

According to the series of processes shown in FIG. 22, when the control unit 20 determines that the camera 2 is moving, digital image stabilization is performed and digital zoom is stopped. Thus, it is possible to suppress blurring of the video data and suitably prevent a situation where digital zoom is performed while the worker T is moving, which dramatically improves the usability of the camera 2.

In this example, digital zoom is performed first, but digital distortion correction may be performed first instead of digital zoom. In this case as well, digital image stabilization is performed and digital distortion correction is stopped when the control unit 20 determines that the camera 2 is moving. Thus, it is possible to suppress blurring of the video data and suitably prevent a situation where digital distortion correction is performed while the worker T is moving.

In the case where digital image stabilization is first performed, the control unit 20 may 20 may stop digital image stabilization in response to determining that the camera 2 is not moving based on the movement data. For example, the control unit 20 may perform digital distortion correction and stop digital image stabilization in response to determining that the camera 2 is not moving.

Example 8: Activation/Deactivation of Digital Image Stabilization Function in Response to the Movement of the Camera 2

Figure 23:
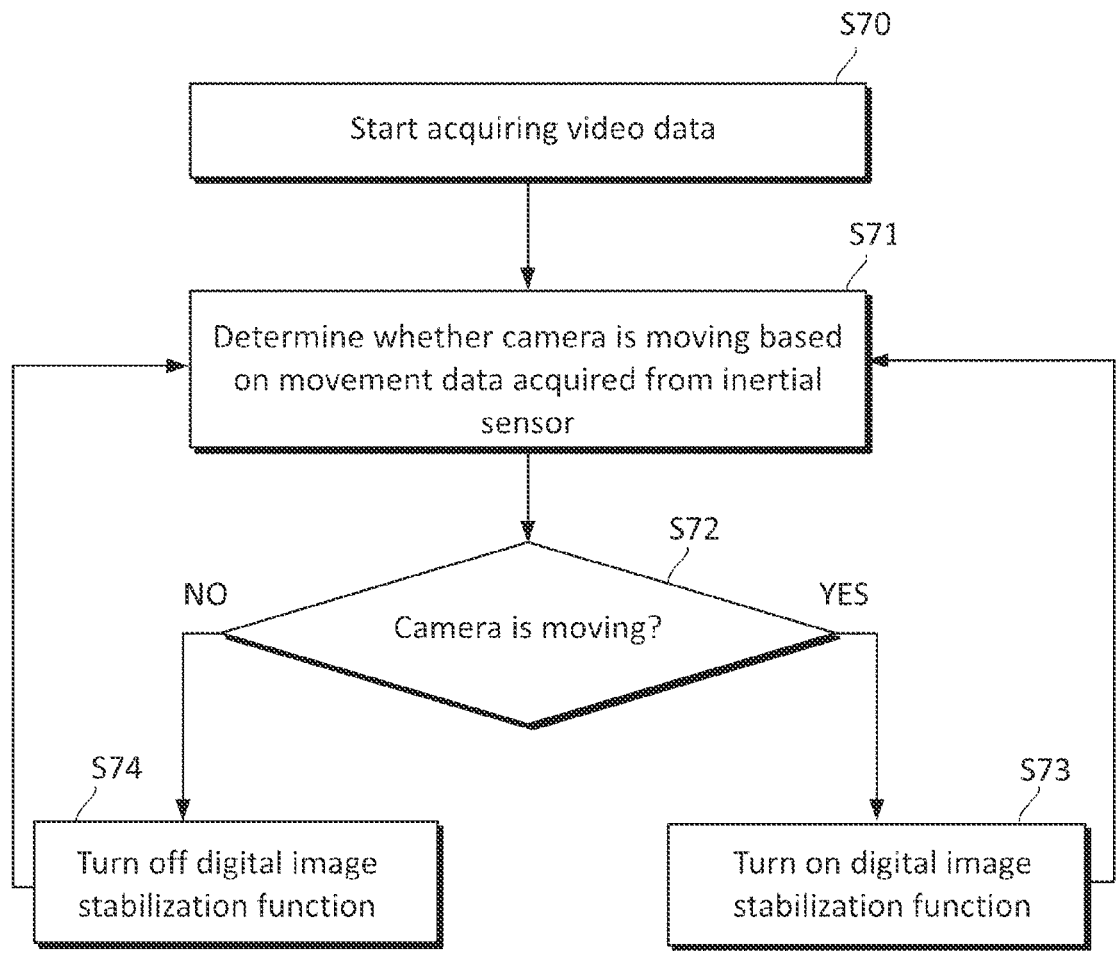
FIG. 23 is a flowchart for explaining a series of processes of turning on or off digital image stabilization function according to camera movement.

Next, with reference to FIG. 23, a series of processes of turning on or off digital image stabilization function in response to the movement of the camera 2 will be described below. FIG. 23 is a flowchart to explain a series of processes of setting the digital image stabilization function ON/OFF in response to the movement of the camera 2.

As shown in FIG. 23, in step S70, the control unit 20 starts acquiring video data. In step S71, the control unit 20 determines whether the camera 2 is moving based on the movement data (in particular, acceleration data) acquired from the inertial sensor 23. If the control unit 20 determines that the camera 2 is moving (YES in step S72), the control unit 20 turns on the digital image stabilization function in step S73 (activation of the digital image stabilization function). On the other hand, if the control unit 20 determines that the camera 2 is not moving (NO in step S72), the control unit 20 turns off the digital image stabilization function (deactivation of the digital image stabilization function) in step S74. Thus, the series of steps S71 to S74 are repeatedly executed at a certain time interval.

According to the series of processes shown in FIG. 23, the control unit 20 stops digital image stabilization in response to determining that the camera 2 is not moving after determining whether the camera 2 is moving or not. Therefore, digital image stabilization stops when the camera 2 is not moving. Thus, it is possible to suppress the increase in the computational load of the control unit 20. On the other hand, when the camera 2 is moving, digital image stabilization is performed to suppress blurring of the video data while the worker T is moving. Thus, the usability of the camera 2 can be dramatically improved.

Although the disclosure and examples have been fully described with reference to the accompanying figures, it should be noted that various changes and modifications will become apparent to persons skilled in the art. Such changes and modifications are to be understood as being included within the scope of the disclosure and examples as defined by the appended claims.

In this embodiment, the series of processes described in each of the above examples are executed by the control unit 20 of the camera 2, but these digital image processes may be executed by the control unit 35 of the server 3 or the control unit 40 of the user device 4 instead of the control unit 20 of the camera 2. In this case, the movement data and video data composed by all pixels of the image sensor 27 maybe transmitted from the camera 2 to the server 3 and user device 4 via the communication network 6. When the series of processes described in each example is executed by the server 3, the server 3 may receive an instruction signal corresponding to the input operation of the user U from the user device 4 and then execute the series of processes in response to the received instruction signal. When the series of processes described in each example is executed by the user device 4, the user device 4 may execute the series of processes in response to an instruction signal corresponding to the input operation of the user U.

Various aspects of the subject matter described herein are set out non-exhaustively in the following numbered clauses.

(1) A video processing system comprises: a portable imaging device; a server communicatively connected to the portable imaging device; and a user device communicatively connected to the server. The video processing system is configured to: acquire video data through shooting; perform a first digital image processing on the video data; and stop the first digital image processing when performing a second digital image processing on the video data in response to a user instruction while the first digital image processing is being performed, wherein the second digital image processing is different from the first digital image processing. The first digital image processing is a digital image stabilization. The second digital image processing is a digital zoom.

(2) A video processing system comprises: a portable imaging device; a server communicatively connected to the portable imaging device; and a user device communicatively connected to the server. The video processing system is configured to: acquire video data through shooting; perform a first digital image processing on the video data; and stop the first digital image processing when performing a second digital image processing on the video data in response to a user instruction while the first digital image processing is being performed, wherein the second digital image processing is different from the first digital image processing. The first digital image processing is a digital zoom. The second digital image processing is a digital image stabilization.

(3) A video processing system comprises: a portable imaging device; a server communicatively connected to the portable imaging device; and a user device communicatively connected to the server. The video processing system is configured to: acquire video data through shooting; perform a first digital image processing on the video data; and stop the first digital image processing when performing a second digital image processing on the video data while the first digital image processing is being performed, wherein the second digital image processing is different from the first digital image processing. The first digital image processing is a digital image stabilization. The second digital image processing is a digital distortion correction.

(4) A video processing system comprises: a portable imaging device; a server communicatively connected to the portable imaging device; and a user device communicatively connected to the server. The video processing system is configured to: acquire video data through shooting; perform a first digital image processing on the video data; and stop the first digital image processing when performing a second digital image processing on the video data in response to determining that the imaging device is moving while the first digital image processing is being performed, wherein the second digital image processing is different from the first digital image processing. The first digital image processing is digital distortion correction. The second digital image processing is a digital image stabilization.

(5) A video processing method performed by a computer, comprises: acquiring video data through shooting; performing a first digital image processing on the video data; and stopping the first digital image processing when performing a second digital image processing on the video data in response to a user instruction while the first digital image processing is being performed, wherein the second digital image processing is different from the first digital image processing. The first digital image processing is a digital image stabilization. The second digital image processing is a digital zoom.

(6) A video processing method performed by a computer, comprises: acquiring video data through shooting; performing a first digital image processing on the video data; and stopping the first digital image processing when performing a second digital image processing on the video data in response to a user instruction while the first digital image processing is being performed, wherein the second digital image processing is different from the first digital image processing. The first digital image processing is a digital zoom. The second digital image processing is a digital image stabilization.

(7) A video processing method performed by a computer, comprises: acquiring video data through shooting; performing a first digital image processing on the video data; and stopping the first digital image processing when performing a second digital image processing on the video data while the first digital image processing is being performed, wherein the second digital image processing is different from the first digital image processing. The first digital image processing is a digital image stabilization. The second digital image processing is a digital distortion correction.

(8) A video processing method performed by a computer, comprises: acquiring video data through shooting; performing a first digital image processing on the video data; and stopping the first digital image processing when performing a second digital image processing on the video data in response to determining that the imaging device is moving while the first digital image processing is being performed, wherein the second digital image processing is different from the first digital image processing. The first digital image processing is digital distortion correction. The second digital image processing is a digital image stabilization.

What is claimed is:

1. A portable imaging device comprising:
   one or more processors; and
   a memory storing one or more programs configured to be executed by the one or more processors, the one or more programs including instructions for:
   acquiring video data through shooting;
   performing a first digital image processing on the video data; and
   automatically stopping the first digital image processing when performing a second digital image processing on the video data while the first digital image processing is being performed, wherein the second digital image processing is different from the first digital image processing,
   wherein
   the first digital image processing is a digital image stabilization, and
   the second digital image processing is a digital distortion correction.

2. The portable imaging device according to claim 1, wherein
   the one or more programs further include an instruction for notifying a user that the first digital image processing will be automatically stopped when stopping the first digital image processing.

3. The portable imaging device according to claim 1, wherein
   the one or more programs further include an instruction for performing the second digital image processing in response to an input operation on the portable imaging device.

4. The portable imaging device according to claim 1, wherein
   the one or more programs further include an instruction for performing the second digital image processing in response to an input operation on a user device, wherein the user device is communicatively connected to the portable imaging device through a communication network.

* * * * *